US012771157B2

(12) United States Patent
Dessecker

(10) Patent No.: US 12,771,157 B2
(45) Date of Patent: Oct. 20, 2026

(54) SYSTEMS AND METHODS FOR SELECTIVELY SWITCHING ENERGY STORAGE MODULES

(71) Applicant: Instagrid GmbH, Ludwigsburg (DE)

(72) Inventor: Julian Andreas Dessecker, Ludwigsburg (DE)

(73) Assignee: Instagrid GmbH, Ludwigsburg (DE)

( * ) Notice: Subject to any disclaimer, the term of this patent is extended or adjusted under 35 U.S.C. 154(b) by 0 days.

(21) Appl. No.: 19/563,232

(22) Filed: Mar. 11, 2026

(65) Prior Publication Data

US 2026/0204939 A1 Jul. 16, 2026

Related U.S. Application Data

(63) Continuation of application No. PCT/EP2025/054456, filed on Feb. 19, 2025.

(30) Foreign Application Priority Data

Mar. 28, 2024 (EP) .................................... 24167211

(51) Int. Cl.
*H02J 7/00* (2026.01)
*H02J 7/34* (2006.01)
(Continued)

(52) U.S. Cl.
CPC .............. *H02J 7/855* (2026.01); *H02J 7/345* (2013.01); *H02J 7/575* (2026.01); *H02J 7/82* (2026.01); *H02J 7/933* (2026.01); *H02J 2207/50* (2020.01)

(58) Field of Classification Search
CPC .. H02J 7/855; H02J 7/345; H02J 7/575; H02J 7/82; H02J 7/933; H02J 2207/50
(Continued)

(56) References Cited

U.S. PATENT DOCUMENTS 3,867,643 A 2/1975 Baker et al.
5,642,275 A 6/1997 Peng et al.
(Continued)

FOREIGN PATENT DOCUMENTS

CA 3217299 A1 * 11/2022 .......... H01M 10/441
CN 114846716 A * 8/2022 .......... H01M 10/486
(Continued)

OTHER PUBLICATIONS

Lahlou, T. et al., Filter Design for Grid-Connected Multilevel CHB Inverter for Battery Energy Storage Systems, 2016 International Symposium on Power Electronics, Electrical Drives, Automation and Motion.
(Continued)

*Primary Examiner* — M Baye Diao
(74) *Attorney, Agent, or Firm* — Fox Rothschild LLP

(57) ABSTRACT

Systems, methods and software products for operating a controllable output power circuit. The methods comprising: providing a first order or list for energy storage modules that is associated with a cycle having a duration; controlling operations of the energy storage modules during the cycle in accordance with the first order/list, wherein at least a first energy storage module is in an energy mode for less than the duration of the cycle; and controlling operations of the energy storage modules during a next cycle in accordance with a second order or list different than the first order/list, wherein at least a different second energy storage module is in the energy mode for less than the duration of the next cycle. The energy mode is a mode in which output terminals of a respective energy storage module are indirectly connected to each other via one or more energy storage components.

38 Claims, 22 Drawing Sheets

(51) Int. Cl.
*H02J 7/50* (2026.01)
*H02J 7/82* (2026.01)
*H02J 7/90* (2026.01)

(58) Field of Classification Search
USPC .......................................................... 320/127
See application file for complete search history.

(56) References Cited

U.S. PATENT DOCUMENTS 6,373,152 B1 * 4/2002 Wang ...................... H02J 7/345 320/167
6,946,818 B2 * 9/2005 Cawthorne ............ B60K 6/445 320/136
6,985,799 B2 * 1/2006 Zalesski .................. H02J 1/102 700/297
10,305,298 B2 * 5/2019 Kristensen .......... H01M 10/425
10,348,102 B2 * 7/2019 Davis ........................ H02J 7/04
10,439,257 B2 * 10/2019 Klausner ................. H02P 27/06
11,356,033 B2 * 6/2022 Kuhn .................... H02J 3/1857
11,398,726 B2 * 7/2022 Zimmermann .. G01R 19/16538
11,407,319 B2 * 8/2022 Goetz ................... B60L 53/122
2014/0232332 A1 * 8/2014 Feuerstack .............. H02J 50/10 320/108
2015/0249351 A1 * 9/2015 Wolff ...................... B60L 53/00 320/116
2023/0016562 A1 * 1/2023 Maarbjerg .......... H01M 10/425

FOREIGN PATENT DOCUMENTS

DE 102010064311 A1 * 7/2012 .............. H02J 7/575
DE 102017209451 A1 12/2018
DE 102019110177 A1 10/2020
DE 102020124465 A1 3/2021
EP 3916948 A1 * 12/2021 .............. H02J 7/933
WO WO-2012038182 A2 * 3/2012 .............. H02J 7/585
WO WO-2014206724 A1 * 12/2014 .............. B60L 53/20
WO WO-2015018748 A1 * 2/2015 .............. B60L 58/18

OTHER PUBLICATIONS

Chung, Y. et al., Voltage Clamping Balance for Charging/Discharging Battery Module, 10th International Conference on Power Electronics—ECCE Asia, May 27-30, 2019, BEXCO, Busan, Korea.

* cited by examiner

For 10 Cycles (90 KHz): Vout = 62.5 Volts using 4 Energy Modules with Voltage $V_{100}$ = 25 V (1) Obtain energy module order for each cycle.

Cycle C: [$100_1$, $100_2$, $100_3$, $100_4$]

→ Right Shifted (by 1 or more)

Cycle C+1: [$100_4$, $100_1$, $100_2$, $100_3$]
Cycle C+2: [$100_3$, $100_4$, $100_1$, $100_2$]
Cycle C+3: [$100_2$, $100_3$, $100_4$, $100_1$]
Cycle C+4: [$100_1$, $100_2$, $100_3$, $104_4$]
Cycle C+5: [$100_4$, $100_1$, $100_2$, $104_3$]
Cycle C+6: [$100_3$, $100_4$, $100_1$, $100_2$]

→ Left Shifted

Cycle C-1: [$100_2$, $100_3$, $100_1$, $100_4$]
Cycle C-2: [$100_3$, $100_2$, $100_1$, $100_4$]
Cycle C-3: [$100_4$ $100_1$, $100_2$, $100_3$]

(2) Determine how many energy storage modules are to be on during a each cycle based on ratio R = Vout/$V_{100}$ = 62.5/25 = 2.5 → 3

(3) Determine how long each energy storage module is to be on during a given cycle based on R = 2.5 → two energy storage modules are on during the entire cycle, one energy storage module is on during a portion of the cycle, and one energy storage module is off during the entire cycle.

→ To determine the portion of the cycle that the third energy storage module is to be on, compute the following:

$V_R$ = Vout - 2($V_{100}$) = 62.5 – 50 = 12. 5

$V_R/V_{100}$ = 12.5/25 = 0.5 indicating that the third energy storage module is to be on for half of the given cycle.

So, for Cycle C → [$100_1$ on 100%, $100_2$ on 100%, $100_3$ on 50%, $100_4$ on 0%]

FIG. 5

For 10 Cycles (90 KHz): Vout = 62.5 Volts using 4 Energy Storage Modules with $V_{100\text{-}1}$ = 23 V, $V_{100\text{-}2}$ = 24V, $V_{100\text{-}3}$ = 25V, $V_{100\text{-}4}$ = 22V (1) Obtain energy storage module order for each cycle.

Cycle C: [$\mathbf{100_1}$, $\mathbf{100_2}$, $\mathbf{100_3}$, $\mathbf{100_4}$]

→ Left Shifted

Cycle C+1: [$\mathbf{100_3}$, $\mathbf{100_4}$, $\mathbf{100_1}$, $\mathbf{100_2}$]

Cycle C+2: [$\mathbf{100_4}$, $\mathbf{100_1}$, $\mathbf{100_2}$, $\mathbf{100_3}$]

Cycle C+3: [$\mathbf{100_1}$, $\mathbf{100_2}$, $\mathbf{100_3}$, $\mathbf{100_4}$]

(2) Determine how many energy storage modules are to be on during cycle C based Vout, $V_{100\text{-}1}$, $V_{100\text{-}2}$, $V_{100\text{-}3}$, $V_{100\text{-}4}$.

$V_{R1}$ = Vout – $V_{FirstBM}$ = Vout – $V_{100\text{-}1}$ = 62.5 – 23 = 39.5

$V_{R2}$ = Vout – $V_{FirstBM}$ – $V_{SecondBM}$ = $V_{R1}$ – $V_{SecondBM}$ = $V_{R1}$ – $V_{100\text{-}2}$ = 39.3 – 24 = 15.5

$V_{R3}$ = Vout – $V_{FirstBM}$ – $V_{SecondBM}$ – $V_{ThirdBM}$ = $V_{R2}$ – $V_{ThirdBM}$ = $V_{R2}$ – $V_{100\text{-}3}$ = 15.5 – 25 = -9.5

→ Stop since $V_{R3}$ is negative $V_{R2}$ – $V_{100\text{-}3}$ and conclude that 3 energy storage modules are to be on during cycle C.

(3) Determine how long each energy storage module is to be on during cycle C based on the remainders $V_{R1}$, $V_{R2}$, $V_{R3}$.

$\mathbf{100_1}$ on 100% of cycle C since $V_{R1}$ is a positive number.

$\mathbf{100_2}$ on 100% of cycle C since $V_{R2}$ is a positive number.

$\mathbf{100_3}$ on <100% of cycle C since $V_{R3}$ is a negative number.

$\mathbf{100_4}$ on 0% of cycle C.

For energy module $\mathbf{100_3}$, further computer $P = (V_{R2} / V_{100\text{-}3}) \cdot 100 = (15.5/25) \cdot 100 = 62\%$ of cycle C.

FIG. 7

SYSTEMS AND METHODS FOR SELECTIVELY SWITCHING ENERGY STORAGE MODULES

CROSS-REFERENCE TO RELATED APPLICATIONS

The present application is a bypass continuation of International PCT Patent Application No. PCT/EP2025/054456 which was filed on Feb. 19, 2025 and claims priority to and the benefit of European Patent Application No. 24167211.2, filed on Mar. 28, 2024, the content of the listed applications are incorporated herein by reference in their entireties.

BACKGROUND

Description of the Related Art

Battery cell packs are often used to power electronic devices. Different combinations of the battery cell packs are used to provide different output voltages.

SUMMARY

The present disclosure concerns implementing systems and methods for operating a controllable output power circuit. The methods comprise: providing, by a circuit, a first order or first ordered list for a plurality of energy storage modules that is associated with a cycle of a plurality of cycles having a duration; controlling, by the circuit, operations of the plurality of energy storage modules during the cycle based on or in accordance with the first order or first ordered list, wherein at least a first energy storage module of the plurality of energy storage modules is in an energy mode for only a portion of the duration of the cycle or less than the duration of the cycle or all of the plurality of energy storage modules are in a bypass mode for the duration of the cycle; and controlling, by the circuit, operations of the plurality of energy storage modules during a next cycle of the plurality of cycles based on or in accordance with a second order or second ordered list different than the first order or first ordered list, wherein at least a different second energy storage module of the plurality of energy storage modules is in the energy mode for less than the duration of the next cycle. The energy mode is a mode in which output terminals of a respective energy storage module are indirectly connected to each other via one or more energy cells.

The present disclosure also concerns a controllable output power circuit. The controllable output power circuit comprises: a processor; and/or a non-transitory computer-readable storage medium comprising programming instructions that are configured to cause the processor to implement a method for operating a plurality of energy storage modules. The processor is configured to and/or the programming instructions comprise instructions to: obtain a first order or first ordered list for a plurality of energy storage modules that is associated with a cycle of a plurality of cycles having a duration; control operations of the plurality of energy storage modules during the cycle based on or in accordance with the first order or first ordered list, wherein at least a first energy storage module of the plurality of energy storage modules is in an energy mode for less than the duration of the cycle; and control operations of the plurality of energy storage modules during a next cycle of the plurality of cycles based on or in accordance with a second order or second ordered list different than the first order or second ordered list, wherein at least a different second energy storage module of the plurality of energy storage modules is in the energy mode for less than the duration of the next cycle.

The present disclosure further concerns a controllable output power circuit. The a controllable output power circuit comprises: a plurality of energy storage modules; and a circuit communicatively connected to the plurality of energy storage modules and configured to: obtain a first order or first ordered list for the plurality of energy storage modules that is associated with a cycle of a plurality of cycles having a duration; control operations of the plurality of energy storage modules during the cycle based on or in accordance with the first order or first ordered list, wherein at least a first energy storage module of the plurality of energy storage modules is in an energy mode for less than the duration of the cycle; and control operations of the plurality of energy storage modules during a next cycle of the plurality of cycles based on or in accordance with a second order or second ordered list different than the first order or first ordered list, wherein at least a different second energy storage module of the plurality of energy storage modules is in the energy mode for less than the duration of the next cycle.

The present disclosure concerns an H-bridge inverter circuit. The H-bridge inverter circuit comprises a supply bus, a driver circuit, a voltage regulator, and bootstrap supply capacitors. The supply bus comprises: a high supply line disposed to provide drain voltage to high-side field effect transistors; and a low supply line with a voltage below the high supply line. The H-bridge inverter circuit may also comprise low-side field effect transistors, e.g., with their source terminals being provided source voltage from the low supply line. The driver circuit is configured to drive the field effect transistors. The voltage regulator is configured to power the driver circuit by a drive voltage which is lower than the voltage on the supply line. One of the bootstrap supply capacitors is provided for each high-side field effect transistors. Each bootstrap supply capacitor is configured to store electrical energy which is used to drive the respective high-side field effect transistor. Each bootstrap supply capacitor is chargeable via a respective diode which allows the bootstrap supply capacitor to be charged only when the source voltage of the corresponding field effect transistor is slewing towards the low supply line.

BRIEF DESCRIPTION OF THE DRAWINGS

The present solution will be described with reference to the following drawing figures, in which like numerals represent like items throughout the figures.

FIGS. 1A-1E are collectively referred to as "FIG. 1".

FIG. 5 provides an illustration that is useful for understanding a novel technique for controlling the energy storage modules in accordance with the present solution.

FIG. 7 provides a graph showing a control scheme for energy storage modules in which one is in a standby mode.

DETAILED DESCRIPTION

The present solution is described with reference to the attached figures. The figures are not drawn to scale and they are provided merely to illustrate the instant solution. Several aspects of the present solution are described below with reference to example applications for illustration. It should be understood that numerous specific details, relationships, and methods are set forth to provide a full understanding of the present solution. One having ordinary skill in the relevant art, however, will readily recognize that the present solution can be practiced without one or more of the specific details or with other methods. In other instances, well-known structures or operations are not shown in detail to avoid obscuring the present solution. The present solution is not limited by the illustrated ordering of acts or events, as some acts may occur in different orders and/or concurrently with other acts or events. Furthermore, not all illustrated acts or events are required to implement a methodology in accordance with the present solution.

It should also be appreciated that the terminology used herein is for the purpose of describing particular embodiments only and is not intended to be limiting of the present solution. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this solution belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
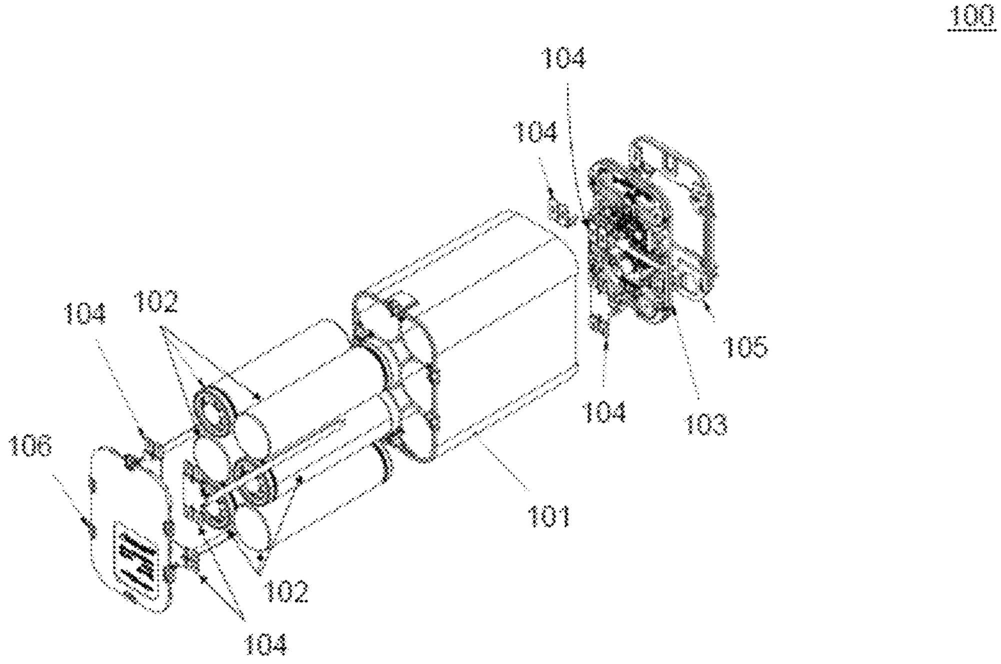
FIG. 1A provides a schematic diagram of an example energy storage module, according to some non-limiting embodiments or aspects.

Referring now to FIG. 1A, depicted is a schematic diagram of an example energy storage module 100, according to some non-limiting embodiments or aspects. As shown in FIG. 1, energy storage module 100 may include housing 101, at least one energy storage component 102, module controller 103, connectors 104, top cover 105, and bottom cover 106. The number and arrangement of components shown are provided as an example. In those or other non-limiting embodiments or aspects, energy storage module 100 may include additional components, fewer components, different components, or differently arranged components than those shown. Additionally or alternatively, a set of components (e.g., one or more components) of energy storage module 100 may perform one or more functions described as being performed by another set of components of energy storage module 100.

In those or other non-limiting embodiments or aspects, housing 101 may include plastic, metal, any combination thereof, and/or the like. For example, housing 101 may include a plastic housing.

In those or other non-limiting embodiments or aspects, housing 101 may be configured to hold at least one (e.g., a plurality of) energy storage components 102. For example, as shown in FIG. 1, housing 101 may be shaped to have six energy storage components 102 uniformly distributed in an interior space defined by housing 101.

In those or other non-limiting embodiments or aspects, each energy storage component 102 may include at least one of a battery, a rechargeable battery (e.g., a lithium-ion battery), a cell (e.g., battery cell, an electrochemical cell, and/or the like), a rechargeable cell, a capacitor, an ultracapacitor, any combination thereof, and/or the like. For example, as shown in FIG. 1, each energy storage component 102 may include a cylindrical cell (e.g., lithium-ion battery cell).

In those or other non-limiting embodiments or aspects, module controller 103 may include a controller and associated circuitry. Optionally, module controller 103 may include a microcontroller, a computing device, a processor, a microprocessor, a digital signal processor (DSP), and/or any processing component (e.g., a field-programmable gate array (FPGA), an application-specific integrated circuit (ASIC), etc.) that can be configured to perform at least one function.

In those or other non-limiting embodiments or aspects, connectors 104 may connect the terminals (e.g., ends) of each energy storage component 102 to module controller 103. Additionally or alternatively, at least one connector 104 may connect at least one terminal (e.g., end) of one energy storage component 102 to another terminal of another energy storage component 102. For example, connectors 104 may include a conductive (e.g., electrically conductive) material, such as metal and/or the like. In those or other non-limiting embodiments or aspects, some or all of the connectors 104 may be used for energy storage component 102 (e.g., cell) voltage measurements.

In those or other non-limiting embodiments or aspects, each of top cover 105 and bottom cover 106 may include plastic, metal, any combination thereof, and/or the like. For example, each of top cover 105 and bottom cover 106 may include a plastic cover. In some non-limiting embodiments or aspects, top cover 105 and bottom cover 106 may be configured to (e.g., sized and shaped to) cover openings at top and bottom ends, respectively, of housing 101. In those or other non-limiting embodiments or aspects, top cover 105 may include a first electrical connection (e.g., S1, as described herein), a second electrical connection (e.g., S2, as described herein), and/or at least one communication connection, as described herein. For example, these connections may allow for electrical and/or communicative connection between module controller 103 and external components (e.g., other components of the power supply system external to the energy storage module housing).

In those or other non-limiting embodiments or aspects, energy storage module 100 may include a battery module. For example, the battery module may include at least one energy storage component (e.g., a battery cell, such as a rechargeable battery cell). For the purpose of illustration, as shown in FIG. 1A, the battery module may include six energy storage components (e.g., rechargeable battery cells, such as lithium-ion cells, supercapacitors, and/or the like).

In those or other non-limiting embodiments or aspects, energy storage components 102 (e.g., battery cells) of energy storage module 100 may be connected in series. In some non-limiting embodiments or aspects, energy storage components 102 (e.g., battery cells) of energy storage module 100 may be connected in parallel.

In those or other non-limiting embodiments or aspects, at least some (e.g., a subset of) energy storage components 102 may be connected in series, for example, so that the combined (e.g., summed and/or the like) voltage of the series-connected components satisfies (e.g., equals, exceeds, and/or the like) the target (e.g., desired) operating voltage of energy storage module 100. In those or other non-limiting embodiments or aspects, at least some (e.g., a subset of) energy storage components 102 may be connected in parallel, for example, so that the combined (e.g., summed and/or the like) capacity (e.g., current) of the parallel-connected components satisfies (e.g., equals, exceeds, and/or the like) the target (e.g., desired) a target capacity (e.g., operating current of energy storage module 100). For example, energy storage module 100 may include a plurality of subsets of energy storage components 102 such that energy storage components 102 of each subset are connected in series (e.g., to combine to output the desired module voltage), or connected in parallel (e.g., to combine to output the desired module current).

In some non-limiting embodiments or aspects, energy storage module 100 may be the same as or similar to or include at least some components that are the same as or similar to the battery modules described in at least one of U.S. Patent Application Pub. No. 2022/0037891, U.S. Patent Application Pub. No. 2022/0247030, U.S. Patent Application Pub. No. 2022/0359918, and/or U.S. Patent Application Pub. No. 2022/0360094, the disclosures of each of which are hereby incorporated by reference in their entireties.

Figure 1B:
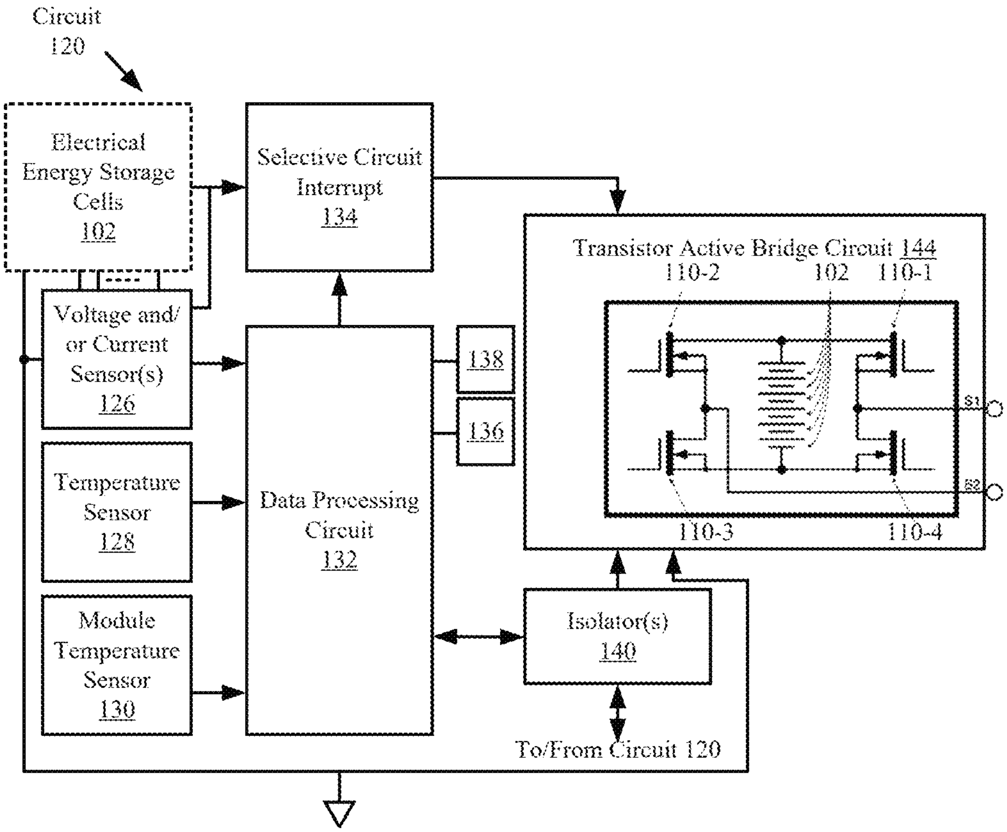
FIG. 1B provides an illustrative block diagram of a circuit in the energy storage module.

As shown in FIG. 1B, a circuit 120 of the energy storage module 100 comprises voltage and optionally, current sensors 126 connected to the energy storage components 102. The energy storage components 102 may include, but are not limited to, electrical energy storage cells as shown in FIG. 1B. These sensors 126 are configured to measure the voltage and/or current of each energy storage component. Circuit 120 may also comprise temperature sensors 128 and a module temperature sensor 130. Each temperature sensor 128 is configured to measure a temperature of one or more energy storage components, while the module temperature sensor 130 is configured to measure an internal temperature of the energy storage module. These sensor measurements are communicated from the sensors 126, 128, 130 to the data processing circuit 132 for processing. The data processing circuit 132 is connected to isolators 140. The data processing circuit 132 can perform operations to communicate sensor measurements as sensor data to the module controller 103 or an external circuit, and/or perform operations to analyze the sensor measurements to determine if certain criteria is met. For example, if a parameter measurement falls outside of defined range at a given time or for a certain amount of time, then the data processing circuit 132 causes the selective circuit interrupt 134 to transition from a closed state to an open state such that the energy storage module 100 is turned off. The parameter measurement can include a voltage measurement, a current measurement or a temperature measurement.

The data processing circuit 132 may be configured to access datastore(s) 136. Datastore(s) 136 can comprise computer-readable storage medium on which is stored one or more sets of instructions configured to implement one or more of the methodologies, procedures, or functions described herein. The instructions can also reside, completely or at least partially, within the data processing circuit 132 during execution thereof by the data processing circuit 132. Datastore(s) 136 and data processing circuit 132 also can constitute machine-readable media. The term "machine-readable media", as used here, refers to a single medium or multiple media (e.g., a centralized or distributed database, and/or associated caches and servers) that store the one or more sets of instructions. The term "machine-readable media", as used here, also refers to any medium that is capable of storing, encoding or carrying a set of instructions for execution by the data processing circuit 132 and that cause the data processing circuit 132 to perform any one or more of the methodologies of the present disclosure. Data processing circuit 132 can include, but is not limited to, processor(s).

Circuit 120 also comprises a switching circuit, shown here in a non-limiting manner as transistor active bridge circuit 144. Switching circuit comprises at least one switching element. As some non-limiting examples, the switching circuit may be realized as a bridge topology comprising switching elements, e.g., as a full H-bridge or a half H-bridge. The switching circuit may be in any form e.g., which facilitates electrical connection of one or more of the storage components 102 to the electrical connection S1 and/or S2. The switching circuit or the transistor active bridge circuit 144 comprises at least one switching element (e.g., first switching element 110-1, second switching element 110-2, third switching element 110-3, and/or fourth switching element 110-4, collectively referred to as "switching elements 110," and individually referred to as "switching element 110"), first electrical connection S1, and second electrical connection S2.

In those or other non-limiting embodiments or aspects, switching elements 110 may be part of (e.g., integrated on, connected to, and/or the like) module controller 103. In those or other non-limiting embodiments or aspects, first electrical connection S1 and/or second electrical connection S2 may be part of (e.g., integrated on, connected to, and/or the like) module controller 103 and/or may extend through top cover 105. The number and arrangement of components shown are provided as an example. In some non-limiting embodiments or aspects, energy storage module 100 may include additional components, fewer components, different components, or differently arranged components than those shown. Additionally or alternatively, a set of components (e.g., one or more components) of energy storage module 100 may perform one or more functions described as being performed by another set of components of energy storage module 100.

As shown in the example in FIG. 1B, energy storage module 100 may include six energy storage components 102 (e.g., rechargeable battery cells and/or the like) connected in series. In those or other non-limiting embodiments or aspects, energy storage components 102 may be in other arrangements and/or have other connections, as described herein.

In those or other non-limiting embodiments or aspects, switching elements 110 may be switched (e.g., opened, closed, activated, deactivated, and/or the like) to selectively connect energy storage component(s) 102 to first electrical connection S1 and/or second electrical connection S2, e.g., to control a module voltage across first electrical connection S1 and second electrical connection S2. For example, switching elements 110 may be switched so that: (1) first electrical connection S1 and second electrical connection S2 are both connected to negative side (e.g., DC minus) of energy storage component(s) 102 (e.g., series connected energy storage components 102); (2) first electrical connection S1 is connected to the negative side (e.g., DC minus) of energy storage component(s) 102 and second electrical connection S2 is connected to the positive side (e.g., DC plus) of energy storage component(s) 102; or (3) first electrical connection S1 is connected to the positive side (e.g., DC plus) of energy storage component(s) 102 and second electrical connection S2 is connected to the negative side (e.g., DC minus) of energy storage component(s) 102. As such, the voltage across first electrical connection S1 and second electrical connection S2 may be zero, negative, or positive, respectively.

For the purpose of illustration by way for a few examples, to connect both first electrical connection S1 and second electrical connection S2 to the negative side (e.g., DC minus) of energy storage component(s) 102, fourth switching element 110-4 and third switching element 110-3 may both be activated (e.g., closed, set to act as a closed switch, switched ON, and/or the like), while second switching element 110-2 and first switching element 110-1 are deactivated (e.g., open, set to act as an open switch, switched OFF, and/or the like). To connect first electrical connection S1 to the negative side (e.g., DC minus) and connect second electrical connection S2 to the positive side (e.g., DC plus) of energy storage component(s) 102, fourth switching element 110-4 and second switching element 110-2 may be activated, while third switching element 110-3 and first switching element 110-1 are deactivated. To connect first electrical connection S1 to the positive side (e.g., DC plus) and second electrical connection S2 to the negative side (e.g., DC minus) of energy storage component(s) 102, first switching element 110-1 and third switching element 110-3 may be activated, and fourth switching element 110-4 and second switching element 110-2 may be deactivated. In those or other non-limiting embodiments or aspects, the switching elements 110 may be operated to be in states such as: a high-impedance (Hi-Z) state (e.g., in which all of the switching elements 110 are deactivated), a bypass state (e.g., in which the low-side switching elements 110-3 and 110-4 are activated while the high-side switching elements 110-1 and 110-2 are deactivated), and two polarity states (e.g., in which the energy storage component(s) 102 are connected between the first electrical connection S1 and the second electrical connection S2 in opposite polarity manner). Even though in the discussed examples, the energy storage components 102 are connected between the electrical connections S1, S2 as a stack, it shall be appreciated that individual cell/storage component level connection may also be possible, e.g., by providing additional switching components to the switching circuit. Thus, each, some, or all storage components 102 of the energy storage module 100 may be connectable at the electrical connections S1 and/or S2.

In those or other non-limiting embodiments or aspects, each switching element 110 may include at least one of a transistor (e.g., bipolar transistor, field-effect transistor (FET), metal-oxide-semiconductor field-effect transistor (MOSFET), and/or the like), a switch, a contactor, any combination thereof, and/or the like. In those or other non-limiting embodiments or aspects, the energy storage module 100 may include one or more driver circuits, such as a gate driver circuit, for driving each switching element 110. For example, the driver circuits may be part of (e.g., integrated on, connected to, and/or the like) module controller 103.

In those or other non-limiting embodiments or aspects, each switching element 110 may be driven, or controlled, via the module controller 103. For example, module controller 103 may control the switching elements 110 to selectively connect energy storage component(s) 102 to first electrical connection S1 and/or second electrical connection S2, as described herein. For example, module controller 103 may be connected to each switching element 110 in order to drive, or optionally control, such switching element 110. In those or other non-limiting embodiments or aspects, the module controller 103 provides signals to the gate driver circuit for driving the switching elements 110.

Figure 1C:
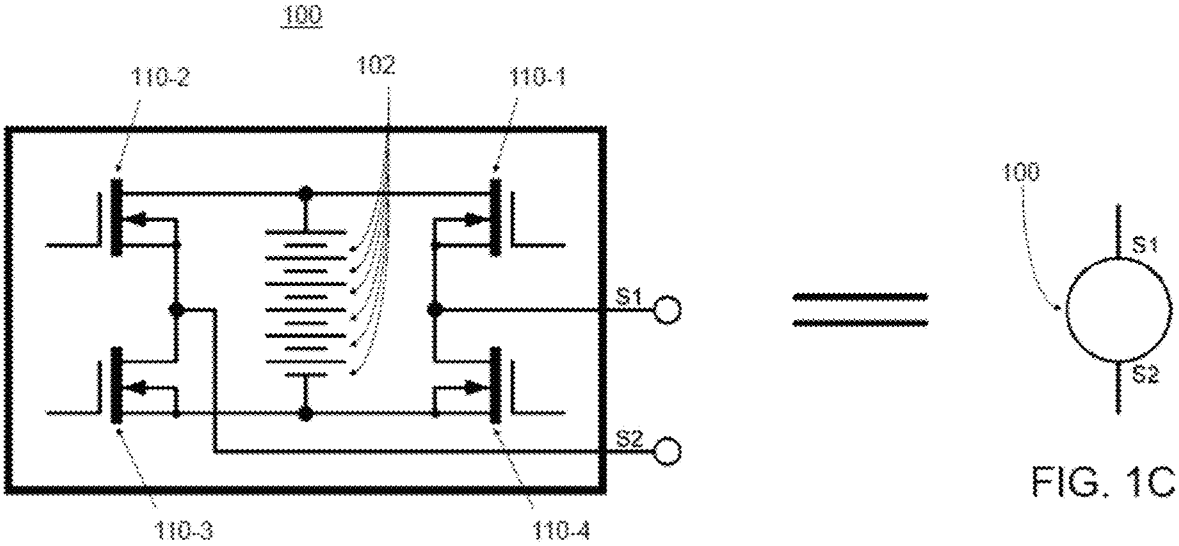
FIG. 1C provides a circuit diagram of an energy storage module, according to some non-limiting embodiments or aspects.

As shown in FIG. 1C, each energy storage module 100 may be represented by the symbol (e.g., for brevity and clarity of the following drawings). The symbol is shown on the right-hand side. On the left-hand side, transistor active bridge circuit 144 is shown in a non-limiting manner, for demonstrating a possible relationship between terminals S1, S2 of the symbol 100 and switching circuit which in this example is shown as bridge circuit 144.

Figure 1D:
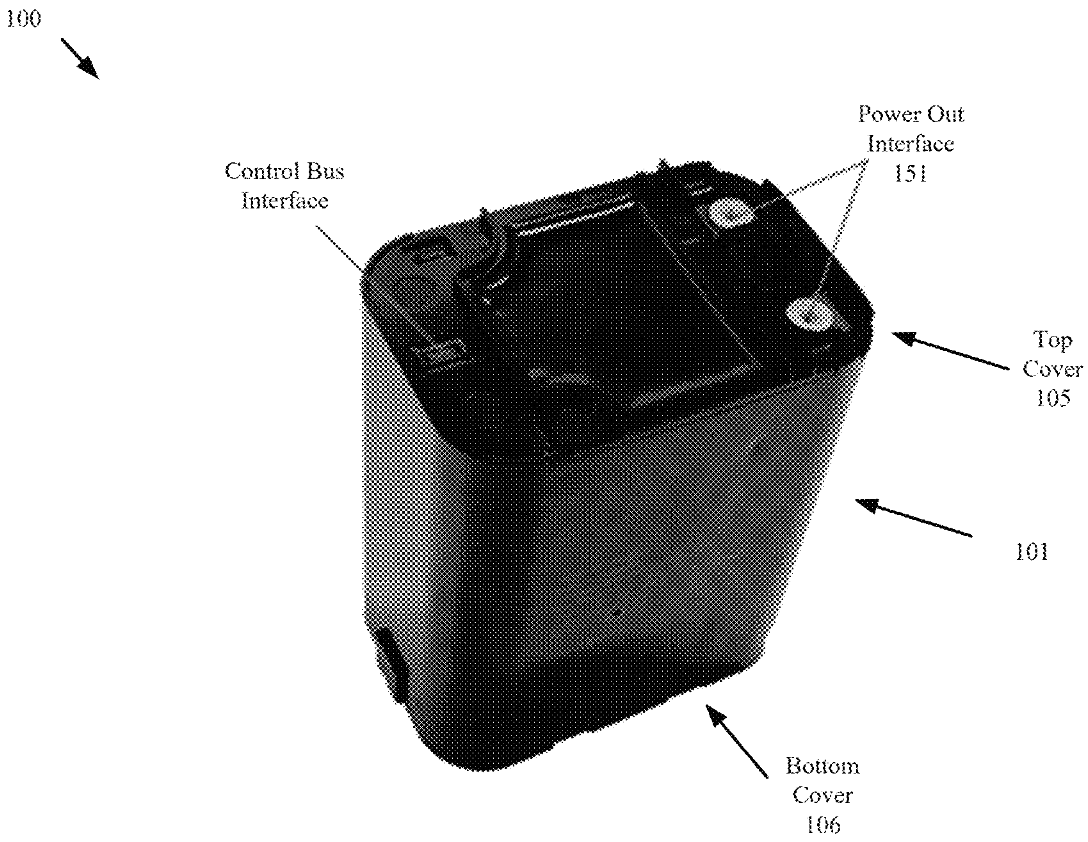
FIG. 1D provides a perspective view of an energy storage module.

FIG. 1D provides an illustration of an energy storage module 100. An assembly view of the energy storage module 100 is provided in FIG. 1A. Energy storage module 100 comprises a housing 101 in which energy storage components 102 are housed so as to maintain certain positions relative to each other. The energy storage components 102 can be arranged in two rows of three energy storage components as shown in FIG. 1A. The present solution is not limited in this regard. The energy storage components can have a different arrangement than that shown in FIG. 1A. Any number of energy storage components can be provided in the energy storage module in accordance with a given application. Each energy storage component may include, but is not limited to, a lithium-ion cell. The lithium-ion cell may have a cylindrical shape as shown or another shape (e.g., a rectangular shape) not shown.

A top cover 105 and a bottom cover 106 are provided for the housing 101. The covers 105, 106 may be configured to provide an environment seal with the housing 101. The environmental seal may be facilitated by gaskets (not visible or shown in FIG. 1D and/or FIG. 1A) compressed between the covers 105, 106 and the housing's sidewalls. The energy storage module 100 also comprises a power out interface 151. It shall be appreciated that electrical connections S1, S2 may be part of the power out interface 151.

The safe and reliable operation of the energy storage module 100 may require the constant monitoring of each energy storage component 102, e.g., to detect when its current (optional), voltage and/or temperature fall outside of defined operating range(s). This monitoring may be achieved using a circuit 120 that is also housed in the housing 101. Conductive connectors 104 are provided to connect the energy storage components 102 to the circuit 120 for at least voltage measurements. In some non-limiting examples, the conductive connectors 104 may also be used for leading operationally generated heat away from the circuit 120 (e.g., heat generated by switching elements 110) preferably away from the energy storage module 100. Alternatively or in addition, some non-limiting examples, the circuit 120 may be arranged such that the energy storage components 102 are also used for leading operationally generated heat away from the circuit 120. For example, a thermal coupling (e.g., passive and/or active, such as gas or fluid cooled) may be provided between the circuit 120 and one or more of the energy storage components 102. Alternatively or in addition, as some non-limiting examples, the power out interface 151 (e.g., via any of the connections S1 and/or S2) may be used for leading operationally generated heat away from the circuit 120. For example, conductive connectors 104 and connections S1 and S2 are realized in electrically conductive materials such as metal. Usually, electrical conductors are also good thermal conductors. This can be leveraged to also act as heat sinks or heat pipes for transporting operationally generated heat (e.g., heat generated when the switching components are conducting current) away from the circuit 120. It shall be appreciated that either alone or in any combination, these measures can make the energy storage module 100 more compact, and in some cases also allow hermetically sealing of the energy storage module 100. This can further result in a more compact system which uses one or more of such energy storage modules 100. These measures can also result in a module and/or system comprising one or more modules that do not require active cooling (e.g., a fan or any other types of additional component or medium used for cooling).

Figure 1E:
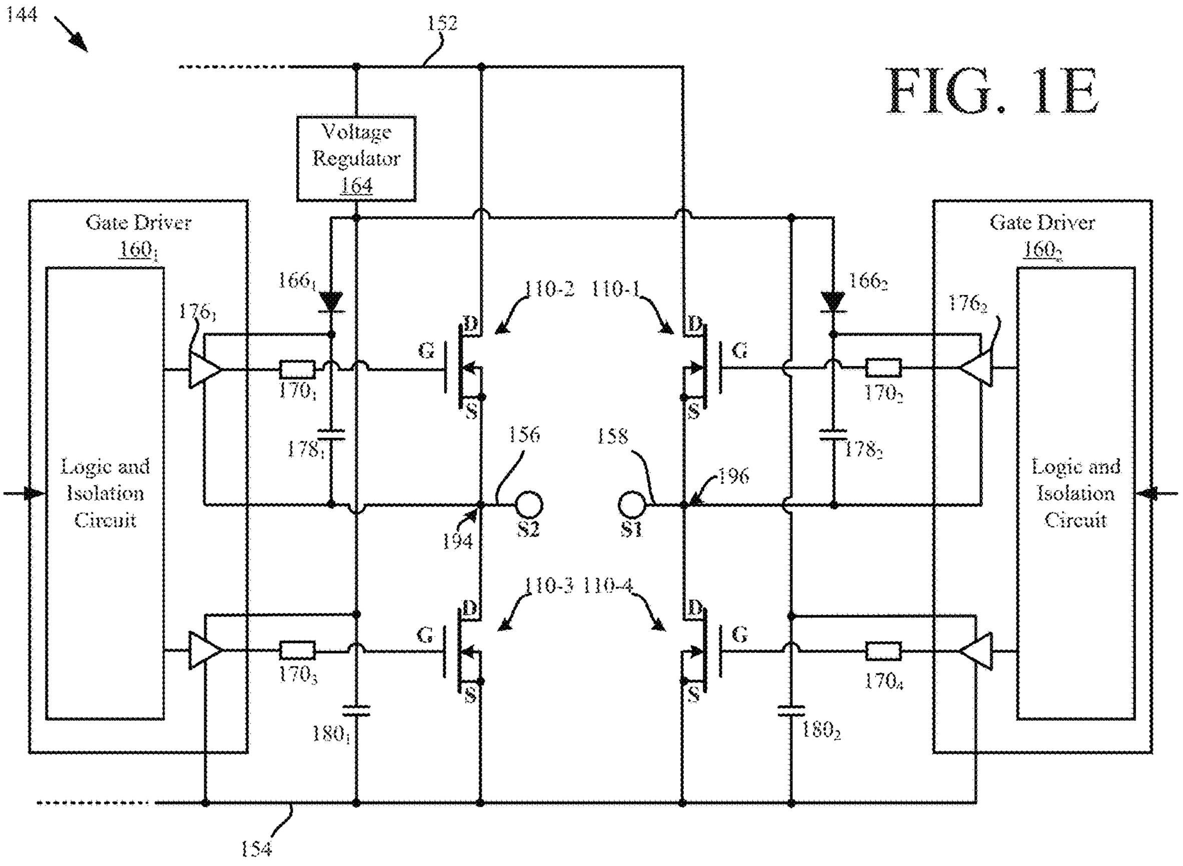
FIG. 1E provides an illustrative circuit diagram for the transistor active bridge circuit.

As shown in a non-limiting example of FIG. 1E, the switching circuit or transistor active bridge circuit 144 comprises gate drivers $\mathbf{160_1}$, $\mathbf{160_2}$, a voltage regulator 164, diodes 1661, 1662 (collectively referred to as "166"), optional resistors $\mathbf{170_1}$, $\mathbf{170_2}$, $\mathbf{170_3}$, $\mathbf{170_4}$ (collectively referred to as "170"), capacitors $\mathbf{178_1}$, $\mathbf{178_2}$, $\mathbf{180_1}$, $\mathbf{180_2}$, and a transistor active bridge 144. The transistor active bridge circuit 144 is supplied a voltage waveform from the energy storage components 102. As such, the transistor active bridge circuit 144 is connected to energy storage components 102 via input lines 152, 154. Input line 152 may be referred to as a high input line, while input line may be referred to as a low input line 154. The transistor active bridge circuit 144 is also connected between a pair of output lines 156, 158. The output lines 156, 158 are connected to the power out interface 151 of FIG. 1D. With reference to the previous FIGS. and discussion, it shall be appreciated that the high input line 152 may be connected to the positive terminal of the energy storage component stack 102, while the low input line 154 may be connected to the negative terminal of the stack of energy storage components 102.

The transistor active bridge circuit 144 includes a plurality of switching elements or switches, shown in this example as field-effect transistors (FETs) 110-2, 110-3, 110-1, 110-4 of an N-channel type. Each of the FETs may comprise a metal-oxide semiconductor FET (MOSFET), but other types of switches or FETs (e.g., insulated gate bipolar transistors (IGBTs), bipolar junction transistors (BJTs), gate turn-off thyristors (GTOs) or their likes or combinations) instead of the shown type can also be contemplated. Each FET 110-2, 110-3, 110-1, 110-4 has three (3) terminals respectively defined as a source S, a gate G and a drain D. An electrical path is provided from the source to the drain of each FET 110-2, 110-3, 110-1, 110-4. This path is generally referred to herein as the source-drain path. A source-drain path of first FET 110-2 is connected in series with a source-drain path of the second FET 110-3. The series connected transistor pair 110-2, 110-3 form a first series transistor combination that is connected across the input lines 152, 154. A source-drain path of the third FET 110-1 is connected in series with a source-drain path of the fourth FET 110-4 to form a second series transistor combination connected across the input lines 152, 154.

The transistor active bridge circuit 144 can have an output defined by output lines 156, 158. A first one of the output lines 156 can be connected to the first series combination 110-2/110-3 at an interconnection point 194 between the first and the second field-effect transistors 110-2, 110-3. A second one of the output lines 158 can be connected to the second series combination 110-1/110-4 at an interconnection point 196 between the third and fourth field-effect transistors 110-1, 110-4.

Gate driver $\mathbf{160_1}$ is provided for driving the gate G of each FET 110-2, 110-3. Similarly, gate driver $\mathbf{160_2}$ is provided for driving the gate G of each FET 110-1, 110-4. In this regard, the gate drivers are configured to supply a voltage to the gate G of each respective FET at certain times for switching the FET to its "on" state or "off" state. The gate drivers are also configured to stop supplying the voltage to the gate G of the FET at certain times for switching the FET to its "on" state or "off" state. Gate driver circuits are well known. Known or to be known gate driver circuit can be used here.

When the gate drivers communicate gate control signals to the FETs, the FETs 110-2, 110-3, 110-1, 110-4 will be biased and switch to their "on" states. In effect, current will flow between the drain D and source S of these FETs. The FETs transition back to their "off" states when the gate control signals are no longer being output from the gate drivers. The gate drivers are configured to prevent the two FETs in each series pair 110-2/110-3 and 110-1/110-4 from being closed simultaneously or concurrently.

The FETs are switched alternatively by the gate driver to provide a certain power output across lines 156, 158. For example, when the energy storage module is in its "on" state, one of the high side FETs 110-2, 110-1 is transitioned to its "on" state for a given period of time (e.g., 1 microsecond (μs)-15 milliseconds (ms), as some further non-limiting examples, a few microseconds (μs), 10 μs, 20 μs, 50 μs, 0.1 ms, 2 ms, 5 ms, or even 10 ms). When the energy storage module is in its "off" state, the two high side FETs 110-2, 110-1 are in their "off" states and the two low side FETs 110-3, 110-4 are in their "on" states. In effect, the two low side FETs are conducting while the two high side FETs are not conducting.

The capacitors 178 are provided to store charge for driving the respective FETs 110-2, 110-1. The respective capacitor 178 is chargeable via their respective diode 166. In this regard, the supply voltage for the high-side gate driver output stages $\mathbf{176_1}$, $\mathbf{176_2}$ is stored in capacitors $\mathbf{178_1}$, $\mathbf{178_2}$. Each of the capacitors $\mathbf{178_1}$, $\mathbf{178_2}$ is recharged when the corresponding output line 156, 158 is slewing towards the low supply line 154, e.g., when the corresponding low side FETs 110-3 or 110-4 is switched to the "on" state. For example, when FET 110-3 is turned "on", the potential at output S2 is pulled towards the potential at source S of FET 110-3. At this time, diode 1661 becomes conductive such that current flows from the voltage regulator 164 through capacitor $\mathbf{178_1}$ and transistor 110-3 to line 154. In effect, capacitor $178_1$ is recharged as the current flows therethrough. When the potential at output S2 is slewing towards the high supply line 152, the diode 1661 acts as a blocking diode such that charge on the capacitor $178_1$ is prevented from flowing back towards the voltage regulator 164. Thus, in this example, charged capacitor $178_1$ supplies voltage to the high-side gate driver output stage $176_1$ for driving the gate terminal of FET 110-2. At some point, the capacitor will be discharged to a level which may cause the gate driver $160_1$ (e.g., at least the high-side gate driver output stage $176_1$) to enter an undervoltage mode in which the gate driver (at least the high-side gate driver output stage) is not operational anymore. The capacitor is recharged before it reaches this level of discharge. An advantage of the preset teachings is that switching of the low-side FETs 110-3, 110-4 can be used to simultaneously charge their corresponding capacitor 178 which is used for driving the high-side FETs 110-2, 110-1.

It is rather common in gate driver circuits to use charge pumps or transformer isolated (e.g., multi-channel) DC-DC converters to facilitate power supply to the gate driver(s). These circuits tend to be relatively expensive. As evident from FIG. 1E, circuit 144 is absent of any charge pumps and therefore is less costly than conventional transistor active bridge circuits. The elimination of the charge pumps was achieved using circuit components 166, 178 to provide the voltage for the high-side gate driver output stages 176 in a controlled manner to avoid or minimize the likelihood that the gate driver $160_1$ enters an undervoltage mode.

Capacitors $180_1$, $180_2$ have a similar role as capacitors $178_1$, $178_2$. However, capacitors $180_1$, $180_2$ are permanently supplied a voltage signal by the voltage regulator 164. As such, the low-side FETs 110-3, 110-4 can be turned "on" for as long as desired. When low-side FET 110-3 is in its "on" state, the potential at output S2 is equal to the potential at source S of FET 110-3. Likewise, the potential at output S1 is equal to the potentiation at source S of FET 110-4 when the FET is in its "on" state.

In view of FIG. 1E, the present solution concerns a method for operating an H-bridge inverter circuit (144), comprising: providing drain voltage of a high-side FETs (110-2 and 110-1) via a high supply line (152), wherein a low supply line (154) has a voltage below the high supply line (152); driving, by a driver circuit (176), the high-side FETs (110-2, 110-1); using a voltage regulator (164) to power the driver circuit (176, 166) by a drive voltage (V at 166 output) which is lower than the voltage on the high supply line (V at 152); storing, by a bootstrap supply capacitor (178) provided for each high-side FET (110-2, 110-1), electrical energy for use in driving the respective high-side FET (110-2, 110-1); charging each bootstrap supply capacitor (178) via a respective diode (166); and/or allowing, by the respective diode (166), the bootstrap supply capacitor (178) to be charged only when the source voltage (V at 156, 158) of the corresponding FET is slewing towards the low supply line (V at 154).

In view of FIG. 1E and as discussed, it shall be appreciated that the present solution also concerns a method for operating a controllable output power circuit (e.g., circuit 144 of FIG. 1), comprising: providing a first order (e.g., providing a first ordered list) for a plurality of energy storage modules (e.g., 102 of FIG. 1) that is associated with a cycle of a plurality of cycles having a duration; controlling operations of the plurality of energy storage modules during the cycle in accordance with the first order (e.g., based on the first ordered list) (wherein at least a first energy storage module of the plurality of energy storage modules is in an energy mode for less than the duration of the cycle); and controlling operations of the plurality of energy storage modules during a next cycle of the plurality of cycles in accordance with a second order (e.g., based on a second ordered list) different than the first order (e.g., different than the first ordered list) (wherein at least a different second energy storage module of the plurality of energy storage modules is in the energy mode for less than the duration of the next cycle). The energy mode is a mode in which output terminals of a respective energy storage module are indirectly connected to each other via one or more energy storage components. At least one of the different second energy storage modules is selected in the second order (e.g., in the second ordered list) for recharging a capacitor (e.g., capacitor 178 of FIG. 1) of that module. The capacitor (e.g., $178_1$ or $178_2$ of FIG. 1) may store charge for driving a switch (e.g., FET 110-2 or 110-1 of FIG. 1) of that module. The capacitor (e.g., $178_1$ or $178_2$ of FIG. 1) may power a gate driver circuit (e.g., $160_1$ or $160_2$ of FIG. 1) of that module. The switch may be a high-side FET (e.g., of type MOSFET, IGFET, JFET or any of their likes or any of their combination). The different second energy storage module may be selected based on a discharge time calculated from the time when the module was last operated in an energy mode for less than the duration of that cycle. The switch may be part of an inverter circuit (e.g., circuit 144 of FIG. 1) (such as a half H-bridge inverter, or a full H-bridge inverter). The capacitor (e.g., $178_1$ or $178_2$ of FIG. 1) may be charged via driving a low-side switch (e.g., FET 110-3 or 110-4 of FIG. 1) connected to the switch (e.g., the switch being a high-side switch, e.g., FET 110-2 or 110-1 of FIG. 1). The capacitor (e.g., $178_1$ or $178_2$ of FIG. 1) may be arranged such that it receives charge via a diode (e.g., diode 1661 or 1662 of FIG. 1) (e.g., a first terminal of the capacitor is connected at the cathode terminal of the diode. The anode terminal of the diode may be connected to a supply voltage (e.g., supplied via voltage regulator 164) from which charge is supplied to the capacitor). A terminal (e.g., a second terminal) of the capacitor (e.g., $178_1$ or $178_2$ of FIG. 1) may be connected at an output node (e.g., node S1 or S2 of FIG. 2) located between the switch and the low-side switch.

Figure 2A:
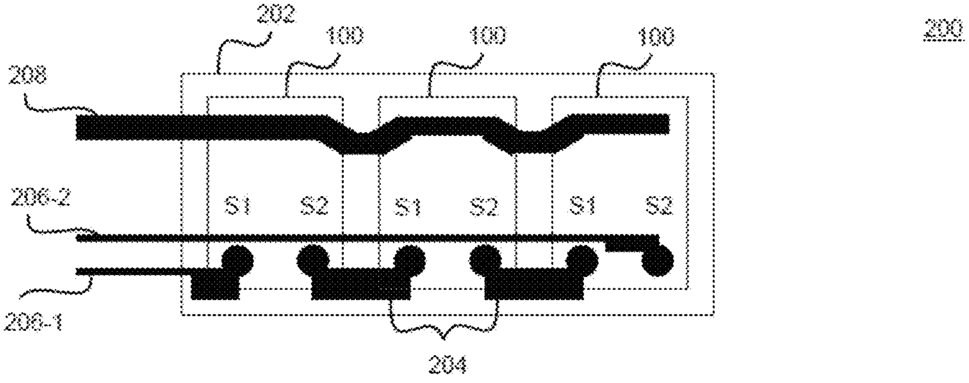
FIGS. 2A-2C (collectively referred to as "FIG. 2") are schematic diagrams of an example energy storage module container of energy storage modules, according to some non-limiting embodiments or aspects.

In those or other non-limiting embodiments or aspects, housing 202 may be configured to hold at least one (e.g., a plurality of, a set of, and/or the like) energy storage modules 100. For example, as shown in FIG. 2A, housing 202 may be shaped to have three energy storage modules 100 uniformly distributed in an interior space defined by housing 202. In some non-limiting embodiments or aspects, there may be any number of energy storage modules 100, as described herein. For example, housing 202 may contain six energy storage modules 100, nine energy storage modules 100, twelve energy storage modules 100, and/or the like.

In those or other non-limiting embodiments or aspects, bar connections 204 may connect energy storage modules 100 within housing 202. For example, as shown in FIG. 2A, a first (e.g., left) bar connection 204 may connect second electrical connection S2 of a first (e.g., left) energy storage module 100 to first electrical connection S1 of a second (e.g., center) energy storage module 100, and a second (e.g., right) bar connection 204 may connect second electrical connection S2 of the second (e.g., center) energy storage module 100 to first electrical connection S1 of a third (e.g., right) energy storage module 100. As such, these energy storage modules 100 may be connected in series. In some non-limiting embodiments or aspects, energy storage modules 100 and/or bar connections 204 may be in other arrangements and/or have other connections (e.g., to connect energy storage modules 100 in series, in parallel, a combination of series and parallel connections, and/or the like, as described herein). In those or other non-limiting embodiments or aspects, bar connections 204 may include a conductive (e.g., electrically conductive) material, such as metal and/or the like. As it was discussed, previously, in some non-limiting embodiments or aspects, bar connections 204 may also be used for leading operationally generated heat away from the respective module(s) 100 (e.g., from circuit 120 of the corresponding energy storage module 100) to which the respective bar connection 204 is connected.

In those or other non-limiting embodiments or aspects, electrical connections 206-1, 206-2 (collectively referred to as "206") may include a conductive (e.g., electrically conductive) material, such as metal and/or the like. For example, electrical connections 206 may include a wire, a cable, and/or the like. In those or other non-limiting embodiments or aspects, electrical connections 206 may allow for electrical connection between energy storage module container 200 (e.g., energy storage modules 100 within energy storage module container 200) and external components (e.g., other components of the power supply system external to housing 202).

In those or other non-limiting embodiments or aspects, first electrical connection 206-1 may be connected to first electrical connection S1 of at least one energy storage module 100. For example, first electrical connection 206-1 may be connected to first electrical connection S1 of a first (e.g., left) energy storage module 100 (e.g., of a group of energy storage modules 100 connected in series). In those or other non-limiting embodiments or aspects, second electrical connection 206-2 may be connected to second electrical connection S2 of at least one energy storage module 100. For example, second electrical connection 206-2 may be connected to second electrical connection S2 of a last (e.g., right) energy storage module 100 (e.g., of a group of energy storage modules 100 connected in series).

In those or other non-limiting embodiments or aspects, communication connection 208 may include at least one component that permits communication among other components. For example, communication connection 208 may include a bus connection (e.g., digital bus, such as controller area network bus (CAN-bus), isolated serial port Interface (isoSPI), any derivatives thereof, any combination thereof, and/or the like). In those or other non-limiting embodiments or aspects, communication connections 208 may allow for communicative connection between container energy storage modules 100 within energy storage module container 200 (e.g., module controllers 103 of such energy storage modules 100) and external components (e.g., other components of the power supply system external to housing 202, such as a system controller and/or the like). The system controller may provide a signal (e.g., command) via communication connection 208 to any of module controllers 103 for operating the switching elements 110 thereof (e.g., via one or more gate driver circuits) in a particular (e.g., controlled) manner.

Figure 2B:
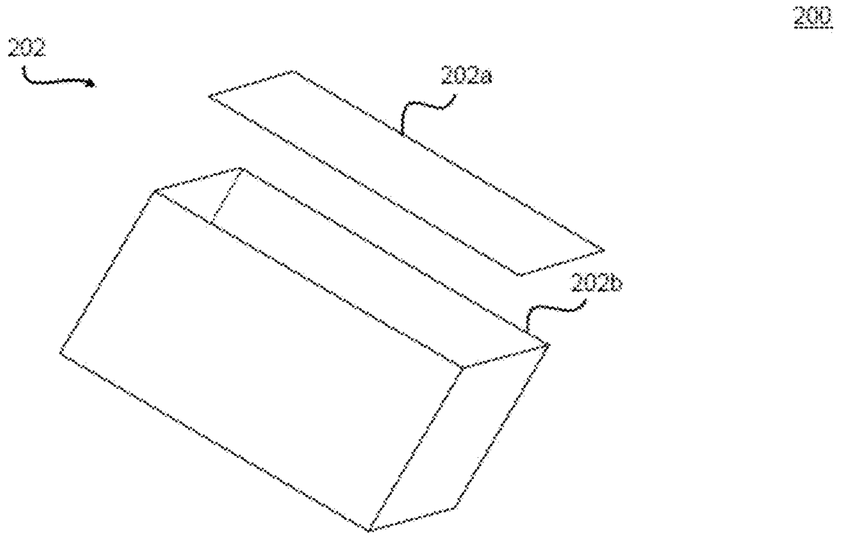
Figure 2C:
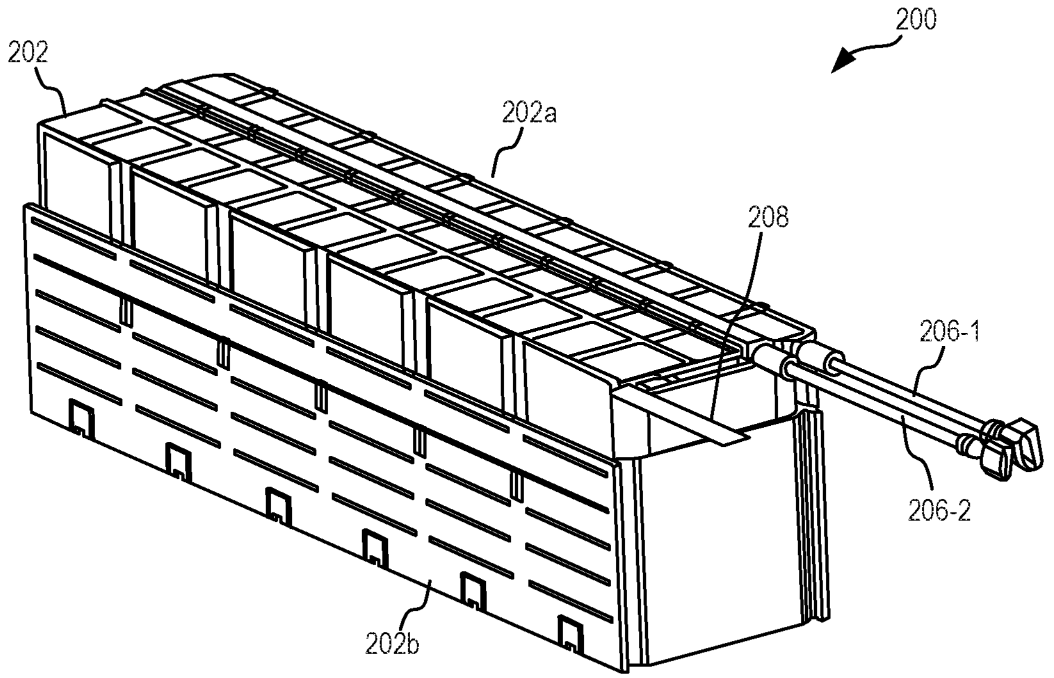

FIGS. 2B-2C provide schematic diagrams of an example energy storage module container 200 of energy storage modules, according to some non-limiting embodiments or aspects. As shown in FIGS. 2A-2C, energy storage module container 200 may include at least one energy storage module 100 (e.g., a plurality or energy storage modules 100, a set of energy storage modules 100, and/or the like of), housing 202 (e.g., including top cover 202*a* and holder 202*b*), bar connections 204, first electrical connection 206-1 and second electrical connection 206-2 (collectively referred to as "electrical connections 206" and individually referred to as "electrical connection 206"), and/or communication connection 208. The number and arrangement of components shown are provided as an example. In those or other non-limiting embodiments or aspects, energy storage module container 200 may include additional components, fewer components, different components, or differently arranged components than those shown. Additionally or alternatively, a set of components (e.g., one or more components) of energy storage module container 200 may perform one or more functions described as being performed by another set of components of energy storage module container 200. In some non-limiting examples, energy storage module container 200 and/or housing 202 may be built from thermally conductive materials, e.g., to lead away operational heat generated in the energy storage modules 100. Especially in combination with earlier discussed measures for heat transfer, this may also allow sealing the energy storage module container 200 and/or housing 202 such that they can result in a device which can be operated in presence of moisture and/or dust. Furthermore, the requirement of active cooling may be avoided. Optionally, a thermally conductive coupling may be provided (e.g., air and/or fluid-based cooling) at one or more locations, e.g., circuit 120, top cover 155, bottom cover 157, module housing 101, power out interface 151, bar 204, housing 202, and energy storage module container 200 for improving heat flow.

Figure 3A:
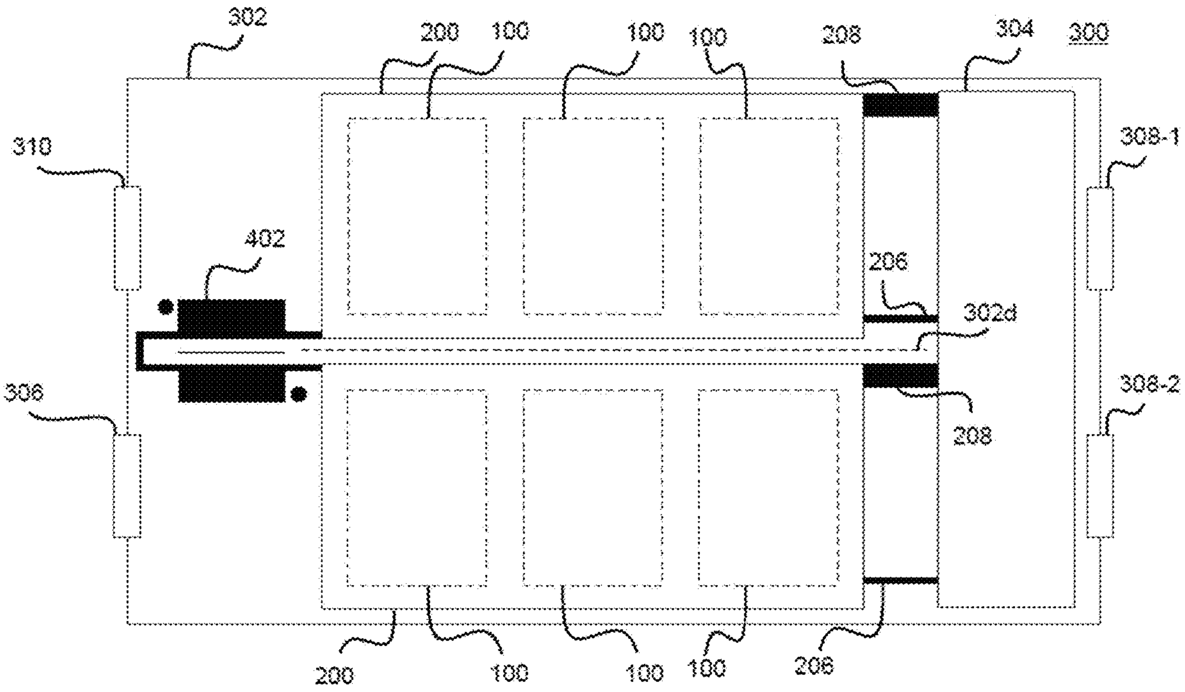
FIGS. 3A and 3B (collectively referred to as "FIG. 3") are schematic diagrams of an example power supply system, according to some non-limiting embodiments or aspects.
Figure 3B:
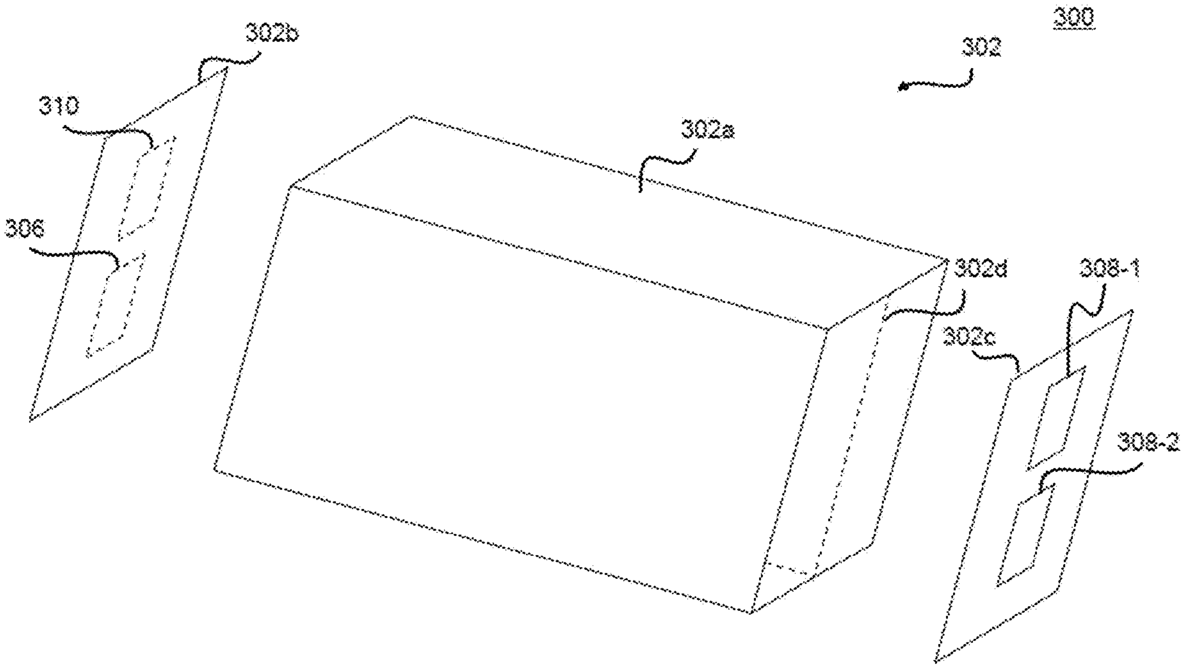

Referring now to FIGS. 3A and 3B, shown are schematic diagrams of an example electrical power system, shown here as a power supply system 300, according to some non-limiting embodiments or aspects. As shown in FIGS. 3A and 3B, power supply system 300 may include at least one energy storage module container 200 (e.g., each including at least one energy storage module 100), electrical connections 206, communication connections 208, housing 302, system controller 304, input connection 306, at least one output connection (e.g., first output connection 308-1 and/or second output connection 308-2, collectively referred to as "output connections 308," and individually referred to as "output connection 308"), and/or choke 402. In those or other non-limiting embodiments or aspects, power supply system 300 may also include communication connection 310. For brevity and clarity, electrical connections 206 and communication connections 208 inside energy storage module container 200 are not shown in FIG. 3A, but energy storage module(s) 100 may be connected to electrical connections 206 and/or communication connections 208, as described herein. For brevity and clarity, connections between energy storage module container 200 (and/or energy storage module(s) 100 thereof) and input connection 306, output connection(s) 308, and/or communication connection 310 are not shown in FIG. 3A, but energy storage module container 200 (and/or energy storage module(s) 100 thereof) may be connected to input connection 306, output connection(s) 308, and/or communication connection 310, as described herein. For brevity and clarity, connections between system controller 304 and input connection 306, output connection(s) 308, and/or communication connection 310 are not shown in FIG. 3A, but system controller 304 may be connected to input connection 306, output connection(s) 308, and/or communication connection 310, as described herein. The number and arrangement of components shown are provided as an example. In those or other non-limiting embodiments or aspects, power supply system 300 may include additional components, fewer components, different components, or differently arranged components than those shown. Additionally or alternatively, a set of components (e.g., one or more components) of power supply system 300 may perform one or more functions described as being performed by another set of components of power supply system 300. For example, in those or other non-limiting embodiments or aspects, choke 402 may be included in and/or a part of system controller 304.

In those or other non-limiting embodiments or aspects, housing 302 may include plastic, metal, any combination thereof, and/or the like. For example, housing 302 may include a metal housing, such as an aluminum housing. Similar to as was discussed before, in some non-limiting examples, there may be provided a thermal coupling between housing 202 and/or energy storage module container 200 and the housing 302 for improving heat transfer/dissipation.

In those or other non-limiting embodiments or aspects, housing 302 may be configured to hold at least one (e.g., a plurality of) energy storage module container(s) 200 and/or at least one (e.g., a plurality of) energy storage modules(s) 100. For example, housing 302 may be configured to hold two energy storage module containers 200, three energy storage containers 200, four energy storage module containers 200, and/or the like. For the purpose of illustration, housing 302 may be configured to hold two energy storage module containers 200, each of which may hold twelve energy storage modules(s) 100 (e.g., a total of 24 energy storage modules(s) 100). For the purpose of illustration, housing 302 may be configured to hold three energy storage module containers 200, each of which may hold eight energy storage modules(s) 100 (e.g., a total of 24 energy storage modules(s) 100). Other non-limiting configurations are also possible, e.g., housing 302 may hold four energy storage module containers 200, each of which may hold six energy storage modules(s) 100 (e.g., a total of 24 energy storage module(s) 100). For the purpose of illustration, housing 302 may be configured to hold two energy storage module containers 200, each of which may hold three energy storage modules(s) 100 (e.g., a total of 6 energy storage modules(s) 100). In those or other non-limiting embodiments or aspects, energy storage module container(s) 200 and/or energy storage module(s) 100 may be in other arrangements within housing 302.

In those or other non-limiting embodiments or aspects, housing 302 may include a plurality of compartments separated by dividers 302*d* (e.g., walls, barriers, and/or the like). For example, the number of compartments may be equal to the number of energy storage module container(s) 200 (e.g., a respective compartment for each respective energy storage module container 200). Each compartment may be separated from the adjacent compartment(s) by a divider 302*d*. For example, one divider 302*d* may separate an interior space of housing 302 into two compartments, two dividers 302*d* may separate an interior space of housing 302 into three compartments, and so on. In those or other non-limiting embodiments or aspects, divider 302*d* may be part of housing 302 and/or may include the same material as housing 302 (e.g., aluminum, metal, plastic, and/or the like).

In those or other non-limiting embodiments or aspects, as shown in FIG. 3B, housing 302 may include body 302*a*, first end cap 302*b*, second end cap 302*c*, and/or at least one divider 302*d*. In those or other non-limiting embodiments or aspects, body 302*a* and/or divider 302*d* may include a first material (e.g., metal, such as aluminum), and first end cap 302*b* and/or second end cap 302*c* may include a second material (e.g., plastic). In those or other non-limiting embodiments or aspects, at least one of first end cap 302*b* and/or second end cap 302*c* may include the same material as body 302*a* and/or divider 302*d*. In those or other non-limiting embodiments or aspects, first end cap 302*b* and second end cap 302*c* may be configured to (e.g., sized and shaped to) cover openings at respective ends of body 302*a*.

In those or other non-limiting embodiments or aspects, first end cap 302*b* and/or second end cap 302*c* may include (and/or may have a space to accommodate) input connection 306, output connection(s) 308, and/or communication connection 310. For the purpose of illustration, as shown in FIG. 3B, input connection 306 and communication connection 310 may be located at first end cap 302*b*, and output connections 308 may be located at second end cap 302*c*. In those or other non-limiting embodiments or aspects, input connection 306, output connection(s) 308, and/or communication connection 310 may be in other arrangements. For example, all of input connection 306, output connection(s) 308, and communication connection 310 may be located at the same end cap (e.g., one of first end cap 302*b* or second end cap 302*c*). As another example, input connection 306 may be located at one end cap, and communication connection 310 and output connection(s) 308 may be located at the other end cap. As another example, input connection 306 and output connection(s) 308 may be located at one end cap, and communication connection 310 may be located at the other end cap. As another example, first output connection 308-1 may be located at one end cap, and second output connection 308-2 may be located at the other end cap.

In those or other non-limiting embodiments or aspects, system controller 304 may include a controller and associated circuitry. For example, system controller 304 may include a microcontroller, a computing device, a processor, a microprocessor, a digital signal processor (DSP), and/or any processing component (e.g., a field-programmable gate array (FPGA), an application-specific integrated circuit (ASIC), etc.) that can be configured to perform at least one function. In those or other non-limiting embodiments or aspects, system controller 304 may be communicatively connected to energy storage module container 200 and/or energy storage module(s) 100 (e.g., module controller(s) 103 thereof) by communication connection 208. In those or other non-limiting embodiments or aspects, system controller 304 may be electrically connected to energy storage module container 200 and/or energy storage module(s) 100 (e.g., energy storage component(s) 102 thereof) by electrical connection(s) 206. In some non-limiting embodiments or aspects, choke 402 may be included in and/or a part of system controller 304.

In those or other non-limiting embodiments or aspects, input connection 306 may include at least one connector (e.g., at least one standardized electrical plug connector, e.g., for mains electric power and/or electrical devices compatible therewith). In those or other non-limiting embodiments or aspects, each output connection 308 may include at least one connector (e.g., at least one standardized electrical plug connector, e.g., for mains electric power and/or electrical devices compatible therewith). For example, first output connection 308-1 may include a connector (e.g., standardized electrical plug connector) suitable for 100-127 V (e.g., at a frequency of 60 Hz suitable for the United States of America, North America, etc.). For example, second output connection 308-2 may include a connector (e.g., standardized electrical plug connector) suitable for 200-240 V (e.g., at a frequency of 50 Hz suitable for the European Union, etc.). In those or other non-limiting embodiments or aspects, communication connection 310 may include at least one connector (e.g., at least one standardized communication plug connector). For example, communication connection

310 may include at least one of a universal serial bus (USB) connector (e.g., USB-A, USB-B, USB-C, USB power delivery (USB-PD), mini-USB, micro-USB, and/or the like), an ethernet connector, a coaxial cable connector, a pin connector, a CAN-bus connector, any combination thereof, and/or the like.

In those or other non-limiting embodiments or aspects, choke 402 may be electrically connected (e.g., coupled and/or the like) to energy storage module container(s) 200 and/or energy storage module(s) 100, as described herein. For example, a first energy storage module container 200 and/or a first set of energy storage modules 100 may be connected to a first connection (e.g., first end, first winding, and/or the like) of choke 402, as described herein. Additionally or alternatively, a second energy storage module container 200 and/or a second set of energy storage modules 100 may be connected to a second connection (e.g., second end, second winding, and/or the like) of choke 402, as described herein.

In those or other non-limiting embodiments or aspects, system controller 304 may command module controller(s) 103 of energy storage module(s) 100 to generate an output voltage based on a combination (e.g., sum and/or the like) of the respective module voltage of each respective energy storage module 100, as described herein. For example, by sequentially connecting multiple energy storage module(s) 100 in series in a time-shifted manner, a combined (e.g., summed) voltage may approximate an AC voltage waveform having a target amplitude (e.g., a voltage substantially equal to the nominal voltage of mains electric power, such as 100-127 V, 200-240 V, and/or the like) and/or a target frequency (e.g., a frequency substantially equal to the nominal frequency of mains electric power, such as 60 Hz, 50 Hz, and/or the like), as described herein.

In those or other non-limiting embodiments or aspects, system controller 304 may command module controller(s) 103 of energy storage module(s) 100 to cause a respective duty cycle of a respective module voltage of each respective energy storage module 100 to generate an output voltage based on a combination (e.g., sum and/or the like) of the respective module voltage of each respective energy storage module 100, as described herein. For example, by modulating the duty cycle differently for multiple energy storage module(s) 100 connected in series, a combined (e.g., summed) voltage may approximate (e.g., better approximate) an AC voltage waveform having a target amplitude and/or a target frequency, as described herein. In those or other non-limiting embodiments or aspects, the duty cycle of the respective module voltage may relate to a switched voltage scheme such as a pulse-width modulation (PWM) type waveform. For example, system controller 304 may command module controller(s) 103 of energy storage modules 100 to switch their output voltage with certain frequency and/or duty-cycle. The exact number or range of the switching frequency is not essential to the scope or generality of the teachings of the present disclosure. As some non-limiting examples, the switching frequency of the system may be in the kHz range (1 kHz to 999 kHz). For example, the switching frequency and/or PWM frequency of the system may be between 40 kHz and 100 kHz. In some cases, the switching frequency and/or PWM frequency of the system may be at or around 90 kHz. In those or other non-limiting embodiments or aspects, module output may be switching (e.g., PWM) at a frequency between 1.5 kHz to 7.5 kHz. For example, module output may be switching (e.g., PWM) at a frequency between 3.5 kHz to 4.5 kHz. As a further example, module output may be switching (e.g., PWM) at a frequency at or around 3.75 kHz. As another example, module output may be switching (e.g., PWM) at a frequency at or around 4 kHz. In those or other non-limiting embodiments or aspects, the switching frequency or PWM frequency of the system may be proportional to a multiplication of the switching frequency and/or PWM frequency of the energy storage module 100 and the number of energy storage modules 100. It shall be appreciated that duty cycle may be anywhere between 0% and 100%, e.g., depending on the time at which the respective energy storage modules 100 are being operated. For example, 0% duty cycle for a given energy storage module 100 may mean that the energy storage module 100 is instructed to be deactivated or in a bypass mode (energy storage module 100 not contributing to the output voltage, but still able to carry current), and 100% duty cycle may mean that that energy storage module 100 is instructed to be switched on or activated in a given polarity. For example, by sweeping the duty cycle of a given energy storage module 100 over time (e.g., between 0% and 100%), the effective output voltage of that energy storage module 100 can be more finely incremented or decremented between voltage steps associated with full switching between two consecutive energy storage modules 100. Various energy storage modules 100 may be orchestrated, e.g., by system controller 304, to generate an output voltage based on a combination of the respective module voltage of each respective energy storage module 100, as described herein.

Figure 4:
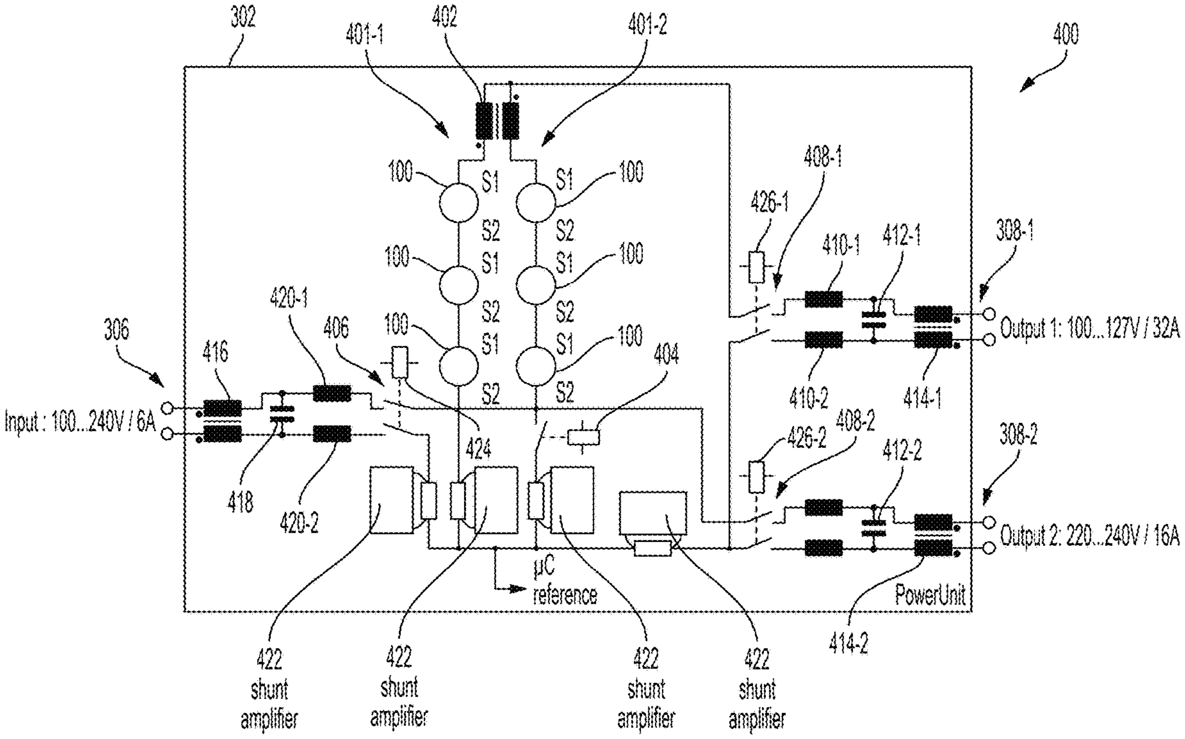
FIG. 4 is a circuit diagram of an example power supply system, according to some non-limiting embodiments or aspects.

Referring now to FIG. 4, shown is a circuit diagram of an example electrical system, for example, a power delivery system such as a power supply system 400, according to some non-limiting embodiments or aspects. In those or other non-limiting embodiments or aspects, power supply system 400 may be the same as or similar to electrical system 300. The number and arrangement of components shown are provided as an example. In those or other non-limiting embodiments or aspects, power supply system 400 may include additional components, fewer components, different components, or differently arranged components than those shown. Additionally or alternatively, a set of components (e.g., one or more components) of power supply system 400 may perform one or more functions described as being performed by another set of components of power system 400.

In those or other non-limiting embodiments or aspects, as shown in FIG. 4, input connection 306 may be connected to input choke 416. Input choke 416 may be connected to input capacitor 418 and/or at least one input inductor (e.g., first input inductor 420-1 and/or second input inductor 420-2, collectively referred to as "input inductors 420," and individually referred to as "input inductor 420"). For example, input choke 416 may be provided for electromagnetic compatibility (EMC) reasons. Similarly, input capacitor 418 may be provided as an EMC capacitor (and/or class-X capacitor), which may stabilize the input voltage and/or make the input less impedant at higher frequencies. For example, input inductor(s) 420 may be used to operate the power supply system 400 in a controlled current mode.

In those or other non-limiting embodiments or aspects, first output connection 308-1 may be connected to first output choke 414-1. First output choke 414-1 may be connected to at least one of capacitor 412-1 and/or inductors 410.

In those or other non-limiting embodiments or aspects, second output connection 308-2 may be connected to second output choke 414-2. Second output choke 414-2 may be connected to capacitor 412-2.

In those or other non-limiting embodiments or aspects, each of the chokes (e.g., input choke 416, first output choke 414-1, and/or second output choke 414-2) may be common-mode chokes and/or the like, e.g., used for EMC performance. It shall be appreciated that further discussion of EMC inductors or capacitors is not essential to the scope or generality of the present teachings.

In those or other non-limiting embodiments or aspects, input switch 424 may selectively connect and/or disconnect input 406 from first set 401-1 and second set 401-2 of energy storage modules 100. In those or other non-limiting embodiments or aspects, to operate in a third mode of operation (e.g., a charging mode of operation) input switch 424 at input 406 may be switched to a first state (e.g., closed, activated, and/or the like). For example, switching input switch 424 to the first state (e.g., closed, activated, and/or the like) may allow current to flow from input connection 306 through input 406 to first set 401-1 and second set 401-2 of energy storage modules 100 (e.g., to charge energy storage modules 100). In those or other non-limiting embodiments or aspects, a power source (e.g., mains electric power, generator power, renewable power (e.g., solar, wind, and/or the like), and/or the like) may be connected to input connection 306. In those or other non-limiting embodiments or aspects, system controller 304 may control module controllers of energy storage modules 100 to charge energy storage components 102 thereof (e.g., based on power from the power source).

In those or other non-limiting embodiments or aspects, to discontinue the third mode of operation (e.g., stop charging) and/or to prevent current from flowing to input connection 306 when power supply system 400 is not in the third (e.g., charging) mode of operation, input switch 424 at input 406 may be switched to a second state (e.g., open, deactivated, and/or the like).

In those or other non-limiting embodiments or aspects, at least one output switching element (e.g., first output switch 426-1 and/or second output switch 426-2, collectively referred to as "output switches 426," and individually referred to as "output switch 426") may selectively connect and/or disconnect outputs 408 from first set 401-1 and second set 401-2 of energy storage modules 100.

In those or other non-limiting embodiments or aspects, to operate in the first mode of operation, in addition to switching of switch 404 to a first state (e.g., closed, activated and/or the like), first output switch 426-1 may be switched to a first state (e.g., closed, activated and/or the like). For example, this may allow current to flow from first set 401-1 and second set 401-2 of energy storage modules 100 through first output 408-1 (and inductors 410 and/or capacitor 412-1) to first output connection 308-1 (e.g., to supply power to a load connected to first output connection 308-1). In those or other non-limiting embodiments or aspects, to prevent current from flowing to first output connection 308-1 when power supply system 400 is not in the first mode of operation, first output switch 426-1 may be switched to a second state (e.g., opened, deactivated and/or the like).

In those or other non-limiting embodiments or aspects, to operate in the second mode of operation, in addition to switching of switch 404 to a second state (e.g., opened, deactivated and/or the like), second output switch 426-2 may be switched to a first state (e.g., closed, activated and/or the like). For example, this may allow current to flow from first set 401-1 and second set 401-2 of energy storage modules 100 through second output 408-2 (and capacitor 412-2) to second output connection 308-2 (e.g., to supply power to a load connected to second output connection 308-2). In those or other non-limiting embodiments or aspects, to prevent current from flowing to second output connection 308-2 when power supply system 400 is not in the second mode of operation, second output switch 426-2 may be switched to a second state (e.g., opened, deactivated and/or the like).

In those or other non-limiting embodiments, the first mode of operation and the second mode of operation may be used to provide multi-voltage operation via the power supply system 400. For example, in the first mode of operation, the first set 401-1 and second set 401-2 of energy storage modules 100 may be connected in parallel, while in the second mode of operation, the first set 401-1 and second set 401-2 of energy storage modules 100 may be connected in series. It shall be appreciated that the first mode of operation may provide an output voltage which is lower than the output voltage provided in the second mode of operation. However, the output current provided in the first mode of operation may be larger than the output current provided in the second mode of operation. For example, the first mode of operation may provide a 110 V output, while the second mode of operation provides a 220 V output. This can advantageously allow the power supply system 400 for multi-voltage domain operation. For example, 110 V AC mains voltage domain is predominantly used in the US, while 220 V AC mains voltage domain is used in Europe. The power supply system 400 can thus allow flexibility in using electrical appliances rated for any of the voltage domains. A particular advantage of the shown configuration can be that output power can be similar or identical in either mode. For example, assuming identical sets (401-1 and 401-2) operating identically, output current in the first mode can be double of the output current in the second mode even though the output voltage in the first mode is half of the output voltage in the second mode. This can allow similar power levels to be used despite the voltage domain which the power supply system 400 output is operating in. The examples of 110 V and 220 V are non-limiting to the teachings as any voltage domain, or operating frequency can be realized with the present structure. Moreover, it is not limiting to have the two domains which are related by an integer factor to each other in terms of voltage and/or current. It shall be appreciated the operating cycle (e.g., order of plurality of modules) can be adapted according to the operating mode of the power supply system 400.

In those or other non-limiting embodiments or aspects, each of input switch 424 and output switches 426 may include at least one of a switch, a contactor, a transistor, any combination thereof, and/or the like. For example, each of the input switch 424 and output switches 426 may include at least one of an SPST switch, a DPDT switch, an SPDT switch, a DPST switch, any combination thereof, and/or the like. For example, each of the input switch 424 and output switches 426 may include at least one of a DPDT switch or a DPST switch. For the purpose of illustration, as shown in FIG. 4, each of the input switch 424 and output switches 426 may include a DPST switch or a DPDT switch.

In those or other non-limiting embodiments or aspects, power supply system 400 may include current sensors 422, which may be in communication with system controller 304 (e.g., a microcontroller). In those or other non-limiting embodiments or aspects, each current sensor 422 may include a shunt amplifier. For example, each shunt amplifier may refer to a common potential (e.g., reference voltage), to which system controller 304 (e.g., a microcontroller) also may refer. In those or other non-limiting embodiments or aspects, at least some (e.g., all, a subset, and/or the like) of current sensors 422 may be any other suitable type of current sensor. For example, a current sensor 422 may include measuring voltage drop across a resistor connected in series (e.g., to at least one of first set 401-1 and/or second set 401-2 of energy storage modules 100), e.g., to measure the current flowing through the resistor (and/or any component in series with the resistor). In those or other non-limiting embodiments or aspects, at least one current sensor 422 may be of a different type than another current sensor 422. For example, a current sensor 422 connected to of first set 401-1 of energy storage modules 100 may be of a different type than another current sensor 422 connected to second set 401-2 of energy storage modules 100.

In those or other non-limiting embodiments or aspects, by measuring current at locations of current sensors 422, the following may be measured (e.g., by system controller 304 and/or the like): output current (e.g., in a redundant manner), input current (e.g., in a redundant manner), circular current (e.g., if strings are connected in parallel). In some non-limiting embodiments or aspects, current sensors may measure current flowing through each of first set 401-1 and second set 401-2 of energy storage modules 100. As such, relative measurements may be performed to detect if a circular (e.g., loop) current is flowing between first set 401-1 and second set 401-2 of energy storage modules 100. In other words, such relative measurements may be used to detect that the load current is divided evenly between the sets. Such measurements also may be used for orchestrating the operation of energy storage modules 100, e.g., in such a manner that the circular (e.g., loop) current may be reduced (e.g., eliminated). Additionally or alternatively, such orchestration may also include disabling certain energy storage modules 100 in any of sets 401, even if such disabling causes an unequal number of active energy storage modules 100 between the sets 401. This may help running the power supply system 400, for example, even if energy storage modules 100 between sets 401 have different charge levels. Additionally or alternatively, such orchestration may include first module voltages of first set 401-1 being interleaved with second module voltages of second set 401-2. Interleaving of the module voltages can be done by phase shifting output voltage of one set with respect to the output of the other set. Additionally or alternatively, such orchestration may include tolerating, or even in some non-limiting embodiments or aspects, creating, an imbalance in voltages between the first set 401-1 and the second set 401-2. This may result in the loop current which tends to flow from one set 401 to the other set 401 to be a low frequency current which can be used, e.g., to equalize state of charge between the two sets 401. Choke 402, even in such non-limiting embodiments or aspects, may block the high frequency currents, but may allow low frequency or DC current to flow from the set 401 having a higher voltage than the other set 401. As such, power supply system 400 may be more robust, flexible, and balanced. In some non-limiting embodiments or aspects, current sensors 422 may be leveraged for making absolute measurements, such as determining total current flowing through first set 401-1 and/or second set 401-2 of energy storage modules 100. It shall be appreciated that said imbalance may be caused by unequal number of energy storage modules 100 operating in one set 401 as compared to the number of energy storage modules 100 operating in the other set 401. Additionally or alternatively, the imbalance may be due to unequal charge level between the two sets 401. Similarly, the power supply system 400 may also include circuit for voltage measurement in one or more networks of the power supply system 400. It is neither essential nor limiting to the present disclosure to specify which voltage measurement circuit or scheme must be used.

Referring now to FIG. 5, there is provided an illustration that is useful for understanding a novel technique for controlling the energy storage modules 100 in accordance with the present solution. In FIG. 5, an assumption is made that each energy storage module has a same voltage associated therewith. However, it should be noted that this may not be the actual case, i.e., a scenario in which an assumption cannot be made that all energy storage modules have the same associated voltage. The algorithm will be discussed in more detail in relation to FIG. 6 in which such an assumption is not made.

The technique generally involves performing the following operations for each cycle: (1) obtaining an energy module order, ordered list or listing for each cycle of N cycles; (2) determining how many energy storage modules are to be on during each cycle of the N cycles; and (3) determine how long each energy storage module is to be on during each cycle of the N cycles. N can be any integer greater than or equal to one. Operations (1)-(3) will now be described in relation to a first scenario in which the energy module voltage is the same for all energy storage modules. Another second scenario in which the energy module voltage is different for each energy storage module will be discussed below.

In the first scenario, N may be ten and each cycle may have a given duration. The duration can include, but is not limited to, 90 kHz. The output voltage Vout of the power supply (e.g., power supply system 300 of FIG. 3 or 400 of FIG. 4) may be, for example, 62.5 Volts. Energy storage modules 100 may be selected to provide the 62.5 Volt output. The output voltage of an energy storage module is referred to as $V_{100}$. Output voltage $V_{100}$ may include, but is not limited to, 25 Volts. The output voltage $V_{100}$ may be obtained via a look-up table (LUT) operation. One or more look-up tables (LUTs) can be stored in a datastore of the power supply.

With regard to operation (1), the energy module order, ordered list or listing for cycle C may be pre-specified as [$\mathbf{100}_1$, $\mathbf{100}_2$, $\mathbf{100}_3$, $\mathbf{100}_4$]. During cycle C, operations of the energy storage modules are controlled based on or in accordance with the energy module order, ordered list, or ordered listing. The energy module order, ordered list or ordered listing is changed per cycle so that the capacitors $\mathbf{178}_1$, $\mathbf{178}_2$ of each energy storage module are periodically re-charged to avoid the gate drivers (e.g., gate driver(s) $\mathbf{160}_1$, $\mathbf{160}_2$ of FIG. 6) from entering an undervoltage state. In this regard, the energy storage modules should be transitioned to their bypass mode at a given frequency. The frequency is selected to avoid or minimize the chance that the gate drivers enter the undervoltage state. The energy module order, ordered list or ordered listing can be changed in accordance with a shifting scheme, a random or pseudo-random scheme, or a criteria-based scheme. The battery order for each cycle can be obtained via LUT operation(s) that access LUT(s) stored in the datastore (e.g., datastore 296 of FIG. 2) of the power supply.

In a shifting scheme scenario, the energy module order, ordered list or ordered listing for a next cycle C+1 is determined by shifting the energy module order or list to the right or left by one or more energy storage modules. A right shift causes the last energy storage module in the order or list to be moved to the front of the next order or list. A left shift causes the first energy storage module in the order or list to be moved to the back of the next order or list. This type of shifting operation, e.g., barrel shifting, may be implemented in hardware and/or software form.

For example, as shown in FIG. 5, the energy module order, ordered list or ordered listing may be shifted by one to the right for next cycles and shifted by one to the left for previous cycles. As such, the energy storage module order, ordered list or ordered listing for a next cycle C+1 is [$\mathbf{100}_4$, $\mathbf{100}_1$, $\mathbf{100}_2$, $\mathbf{100}_3$], and so on. The energy storage module order, ordered list or ordered listing for a previous cycle C−1 is [$\mathbf{100}_2$, $\mathbf{100}_3$, $\mathbf{100}_1$, $\mathbf{100}_4$], and so on. The present solution is not limited to the particulars of this example. Alternatively, the energy module order, ordered list or ordered listing may be shifted by any number to the left for next cycles and shifted to any number to the right for previous cycles.

Figure 12:
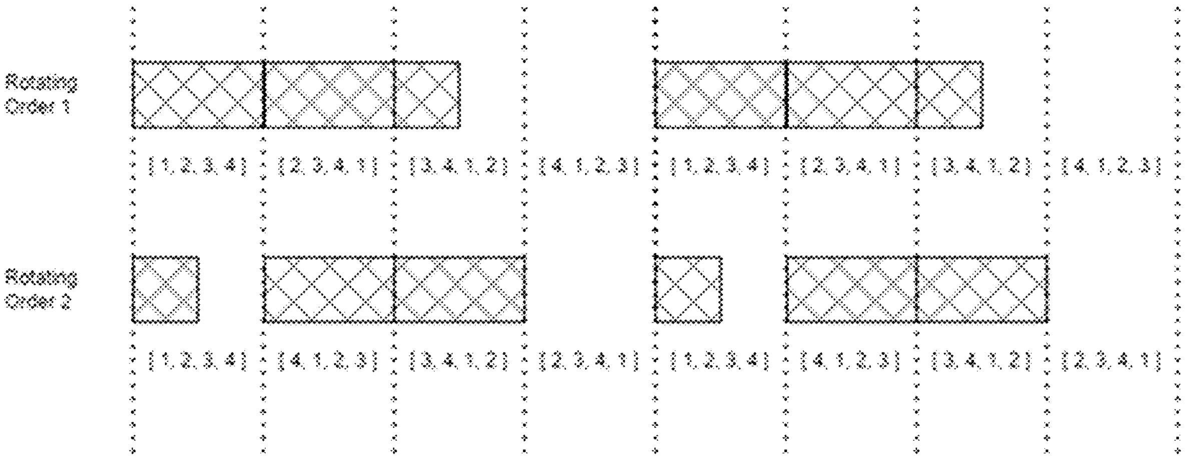
FIG. 12 provides an illustration that is useful for understating right and left shifting of a battery module order.

It should be noted that the different switching results are obtained based on the shifting direction. Depending on the order of the energy module rotation, the number of switching operations per energy module changes. A goal may be to minimize the number of switching operations per energy storage module for two reasons: more switching causes a higher thermal load; and more switching creates more voltage transients which are undesirable. It would also be possible to do a random permutation of the switching order but, at a high number of energy storage modules, this would cause a lot more of switching operations. An illustration is provided in FIG. 12 that illustrates the switching difference for right and left shifting of a battery module order.

In the criteria-based scheme scenario, the energy module order, ordered list or ordered listing is changed per cycle based on certain criteria. This criteria can include, but is not limited to, a predicted state of charge of a capacitor (e.g., capacitor $\mathbf{178}_1$ or $\mathbf{178}_2$ of FIG. 1E), a duration of charge for the capacitor, a predicted time that the capacitor's charge level falls below threshold, a last time of charge for the capacitor, a last time that an energy storage module was "on" an entire cycle, and/or a frequency that each energy storage module should be transitioned to their bypass mode to avoid or minimize the chance that the gate drivers enter the undervoltage state. The threshold can include, but is not limited to, five volts.

Alternatively, the battery order for each cycle can be dynamically determined by the controller based on the current state of charge of each bootstrap capacitor (e.g., capacitor $\mathbf{178}_1$ or $\mathbf{178}_2$ of FIG. 1E). The current state of charge could be measured by sensor(s) (e.g., sensors 138 of FIG. 1B), computed or predicted using a trained machine learning model. The current state of charge may be computed using a total number of previous cycles that a respective energy storage module was "on" over a specified window. The specified window can be defined by a preselected number of cycles. For example, the specified window is equal to five cycles. The present solution is not limited in this regard.

Operation (2) involves determining how many energy storage modules are to be on during each cycle. It should be noted that, in all scenarios, at least one energy storage module will not be "on" (or in its energy mode) during the entire duration of each cycle. This feature of the present solution assures that the gate driver related capacitors (e.g., capacitors 178 of FIG. 1E) in each energy storage module are periodically recharged.

The determination of operation (2) can be made based on a ratio R of the power supply's output voltage Vout and the energy module voltage $V_{100}$. The ratio R can be defined by the following mathematical equation (1).

$$R = \text{Vout}/V_{100} \quad (1)$$

In FIG. 5, the ratio R=62.5/25=2.5 which is rounded to three. So, three energy storage modules are needed to provide the output voltage Vout of 62.5 Volts.

Operation (3) involves determining how long each energy storage module is to be on during each cycle based on the ratio R. Each energy storage module can be "on" during the entire duration (e.g., in kHz range, e.g., 90 kHz) of a given cycle, bypassed during the entire duration (e.g., in kHz range, e.g., 90 kHz) of a given cycle, or "on" during only a portion of the given cycle's duration. It should be noted that an energy storage module is in the energy mode when it is "on" and in the bypass mode when it is being bypassed. As noted above, the low side transistors (e.g., FETs 110-3, 110-4 of FIG. 6) are in their "on" states when the energy storage module is in its bypass mode. As such, the capacitors (e.g., capacitors $\mathbf{178}_1$, $\mathbf{178}_2$ of FIG. 1E) that supply power to the high-side gate driver output stages (e.g., stages $\mathbf{176}_1$, $\mathbf{176}_2$ of FIG. 6) are charged when the energy storage module is in its bypass mode.

In FIG. 5, the ratio R is 2.5 which indicates that (I) two energy storage modules are to be "on" the entire duration of the given cycle, (II) one energy storage module is to be "on" for only a portion of the given cycle's duration, and (III) one battery is to be "off" for the entire given cycle's duration. The portion of the given cycle's duration is computed in accordance with the following mathematical equation (2)-(3).

$$V_R = \text{Vout} - BM_{entire}(V_{100}) \quad (2)$$

$$P = (V_R/V_{100}) \cdot 100 \quad (3)$$

$V_R$ represents a remaining voltage, $BM_{entire}$ represents a total number of energy storage modules that are to be on the entire cycle duration, and P represents a percentage of the cycle duration.

Based on the results from operations (1) and (3), the controller controls the four energy storage modules accordingly. For example, in a cycle C, the controller causes both energy storage module $\mathbf{100}_1$ and $\mathbf{100}_2$ to be on for 100% of the cycle. Controller also causes energy storage module $\mathbf{100}_3$ to be on for 50% of the cycle. Energy storage module $\mathbf{100}_4$ is on for 0% of the cycle. A graph 800 is provided in FIG. 6 which is useful for understanding operations of the energy storage modules during a plurality of cycles C−3, C−2, C−1, C, C+1, C+2, C+3, C+4, C+5, C+6. It is evident from graph 800 that a different energy storage module is in its "off" state per cycle. This allows the capacitors 1181, 1182 to periodically recharge during operation of the power supply. It is also evident from graph 800 that (i) a different combination of energy storage modules is in the "on" state during each cycle and (ii) a different energy storage module is used per cycle to supply voltage during 50% of the cycle duration.

Referring now to FIG. 7, a second scenario will be described in which the energy storage modules have different voltages. It should be noted that the process of FIG. 7 can also be used in scenarios similar to that of FIGS. 5-6 in which the energy storage modules have the same voltages.

Figure 6:
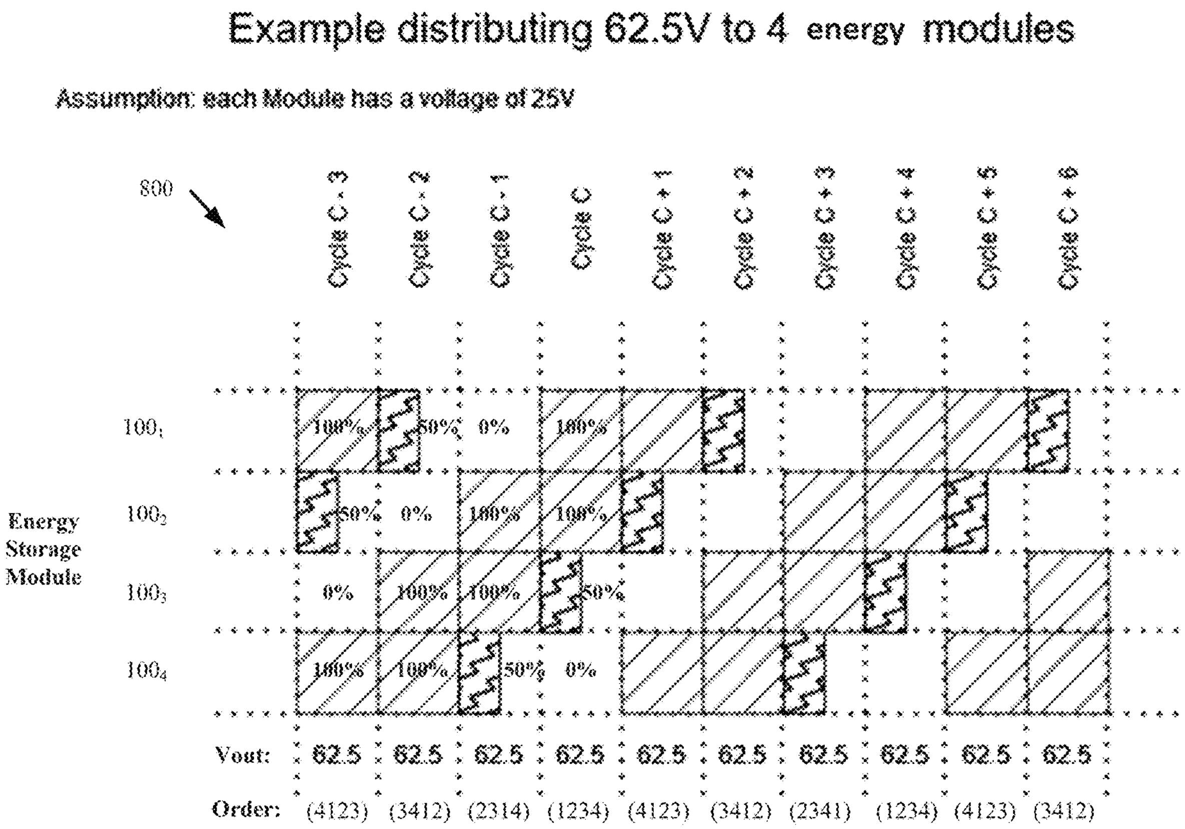
FIG. 6 provides a graph that is useful for understanding the novel technique of FIG. 7.

Similar to the first scenario of FIG. 5-6, the energy storage modules may be controlled in the second scenario of FIG. 7 for ten consecutive cycles each 90 kHz long. The output voltage Vout may be 62.5 Volts. Energy storage modules $100_1$, $100_2$, $100_3$, $100_4$ may be selected to provide the 62.5 Volt output. The output voltage for an energy storage module may be is referred to as $V_{100\text{-}X}$, where X is a number assigned to a particular energy storage module. The output voltage for energy storage module $100_1$ is $V_{100\text{-}1}$. The output voltage for energy storage module $100_2$ is $V_{100\text{-}2}$. The output voltage for energy storage module $100_3$ is $V_{100\text{-}3}$. The output voltage for energy storage module $100_4$ is $V_{100\text{-}4}$. Voltage $V_{100\text{-}1}$ may be 25 Volts. Voltage $V_{100\text{-}2}$ may be 24 Volts. Voltage $V_{104\text{-}3}$ may be 23 Volts. $V_{100\text{-}4}$ may be 22 Volts. The output voltages $V_{100\text{-}1}$, $V_{100\text{-}2}$, $V_{100\text{-}3}$, $V_{100\text{-}4}$ may be obtained via LUT operation(s) that involve accessing LUT(s) stored in a datastore of the power supply.

With regard to operation (1), the energy module order, ordered list or ordered listing for cycle C may be pre-specified as [$100_1$, $100_2$, $100_3$, $100_4$]. The energy module order, ordered list or ordered listing is changed per cycle so that the capacitors $178_1$, $178_2$ of each energy storage module are periodically re-charged to avoid the gate drivers from entering an undervoltage state. The energy module order, ordered list or ordered listing can be changed in accordance with a shifting scheme, a random or pseudo-random scheme, or a criteria-based scheme. For example, as shown in FIG. 7, the energy module order, ordered list or ordered listing is changed per cycle by a shift of two to the left. The present solution is not limited in this regard. The energy module order(s), ordered list or ordered listing can be obtained via LUT operation(s) that involve accessing LUT(s) stored in the datastore (e.g., datastore 296 of FIG. 2) of the power supply.

Operation (2) involves determining how many energy storage modules are to be on during each cycle. This determination can be made based on the values of Vout, $V_{100\text{-}1}$, $V_{100\text{-}2}$, $V_{100\text{-}3}$, $V_{100\text{-}4}$. This determination involves computing voltage remainders using these listed values. The voltage remainders may be defined by the following mathematical equations (4)-(6).

$$V_{R(1)} = \text{Vout} - V_{FirstBM} \tag{4}$$

$$V_{R(2)} = \text{Vout} - V_{FirstBM} - V_{SecondBM} = V_{R(1)} - V_{SecondBM} \tag{5}$$

$$\ldots$$

$$V_{R(N)} = \text{Vout} - V_{FirstBM} - V_{SecondBM} - \ldots - V_{NthBM} = V_{R(N-1)} - V_{NthBM} \tag{6}$$

where $V_{R(1)}$ represents a first remaining voltage, $V_{R(2)}$ represents a second remaining voltage, $V_{R(N)}$ represents and Nth remaining voltage, $V_{FirstBM}$ represents a first energy storage module identified in the energy module order, ordered list or ordered listing for a given cycle, $V_{SecondBM}$ represents a second energy storage module identified in the energy module order, ordered list or ordered listing for the given cycle, and $V_{NthBM}$ represents an Nth energy storage module identified in the energy module order, ordered list or ordered listing for the given cycle. The remainder computation is completed when a result has a negative value. This will become clearer by applying mathematical equations (4)-(6) to the scenarios of FIG. 7.

As shown in FIG. 7, mathematical equation (4)-(6) can be re-written as follows for cycle C.

$$V_{R(1)} = \text{Vout} - V_{FirstBM} = \text{Vout} - V_{100-1} = 62.5 - 23 = 39.5$$

$$V_{R(2)} = V_{R(1)} - V_{SecondBM} = V_{R(1)} - V_{100-2} = 39.5 - 24 = 15.5$$

$$V_{R(3)} = V_{R(2)} - V_{ThirdBM} = V_{R(2)} - V_{100-3} = 15.5 - 25 = -9$$

Since $V_{R(3)}$ is a negative number, the remainder computation operation is stopped or otherwise terminated. The system concludes or otherwise determines that three energy storage modules are to be on during cycle C based on these computations.

Operation (3) involves determining how long each energy storage module is to be on during each cycle based on the remainders $V_{R(1)}$, $V_{R(2)}$, . . . , $V_{R(N)}$. Each energy storage module can be "on" during the entire duration (e.g., in kHz range, e.g., 90 kHz) of a given cycle, "off" during the entire duration (e.g., in kHz range, e.g., 90 kHz) of a given cycle, or "on" during only a portion of the given cycle's duration. In FIG. 7, energy storage modules $100_1$, $100_2$ are on for 100% of cycle C since $V_{R(1)}$ and $V_{R(2)}$ are positive numbers. Energy storage module $100_4$ is off for 100% of cycle C since only three energy storage modules are to be on during cycle C. However, energy storage module $100_3$ is to be on for less than 100% of cycle C since $V_{R(2)}$ is a negative number. Mathematical equation (3) can be used to determine the percentage of cycle C that energy storage module $100_3$ is to be on. As such, mathematical equation (3) can be rewritten as shown below for the scenario of FIG. 7.

$$P = (V_{R(2)}/V_{100-3}) \cdot 100 = (15.5/25) \cdot 100 = 62\%$$

Based on results of this computation, the system concludes or otherwise determines that energy storage module $100_3$ is to be on 62% of cycle C.

The above-described operations (1)-(3) are repeated for a next cycle C+1. This iterative process provides a pulse width modulation (PWM) duty cycle which allows the low side transistors (e.g., FETs 110-3, 110-4 of FIG. 6) of each energy storage module to be intermittingly turned on for charging the capacitors (e.g., capacitors $178_1$, $178_2$ of FIG. 6) that supply power to the high-side gate driver output stages (e.g., stages $176_1$, $176_2$ of FIG. 6).

Figure 8:
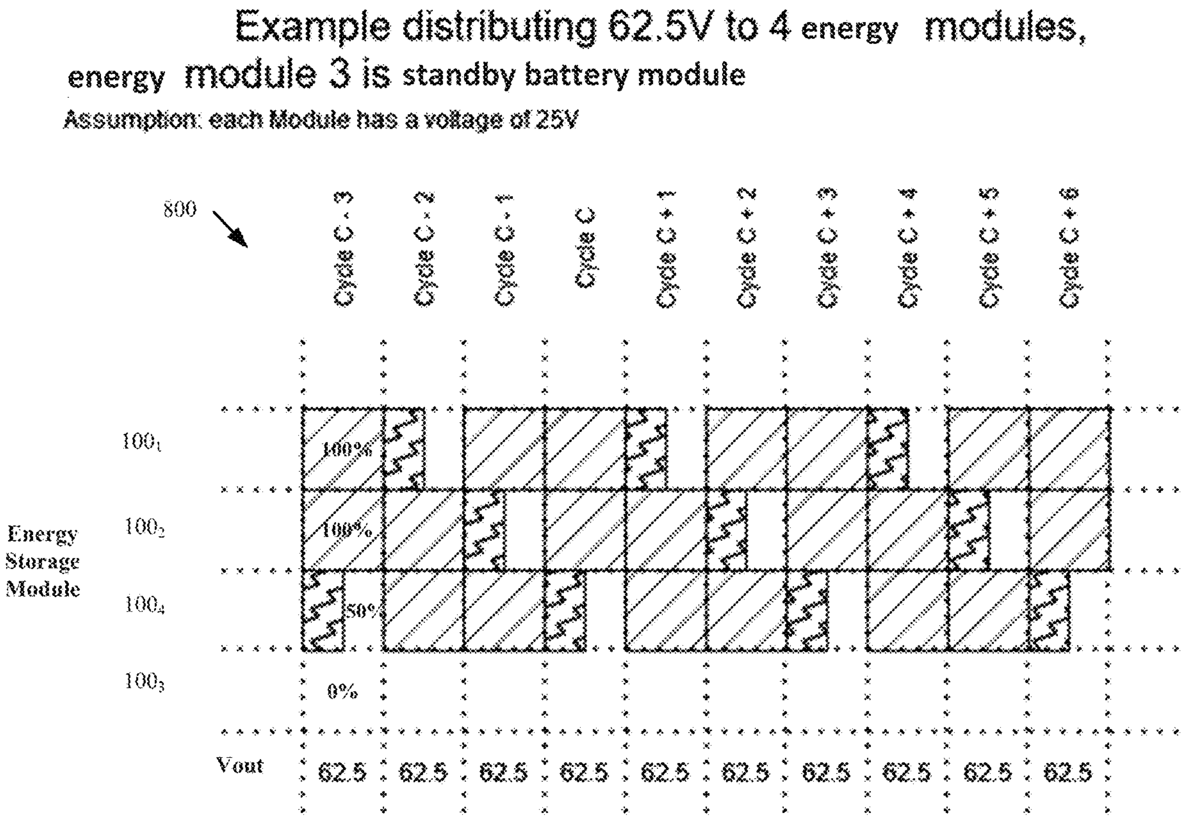
FIGS. 8-9 each provides a graph showing another control scheme for energy storage modules in which one is in a standby mode.

Referring now to FIG. 8, a graph 800 is provided that is useful for understanding operations of a power supply (e.g., power supply system 300 of FIG. 3 or 400 of FIG. 4) in which an energy storage module is selected to act as a standby energy module. The standby energy module provides an inter-module charge balancing feature to the power supply. This inter-module charge balancing feature ensures that, during the charging mode and discharging mode of the power supply, the state of charge of each energy storage module may be periodically checked at defined times (e.g., every x ms, where x is an integer equal to or greater than one). The LUTs may be updated at this time. In the discharging mode, the energy storage module with the lowest state of charge is selected as the standby energy module. In contrast, in the charging mode, the energy storage module with the highest state of charge is selected as the standby energy module.

FIG. 8 covers a scenario in which the power supply is in the discharging mode of operation. The standby energy module can be the same in each cycle of the N cycles as shown in FIG. 8 or different in each cycle or a given number of cycles. The corresponding graph for the later scenario would look the same as or similar to that shown in FIG. 6. Thus, FIG. 6 is sufficient for understanding the later scenario. FIG. 8 illustrates the scenario in which energy storage module $\mathbf{100}_3$ is selected as the standby energy module for all cycles C−3, C−2, C−1, C, C+1, C+2, C+3, C+4, C+5, C+6. In effect, energy storage module $\mathbf{100}_3$ is in its bypass mode during 100% of each cycle when the output voltage of the power supply is 62.5 Volts.

Figure 9:
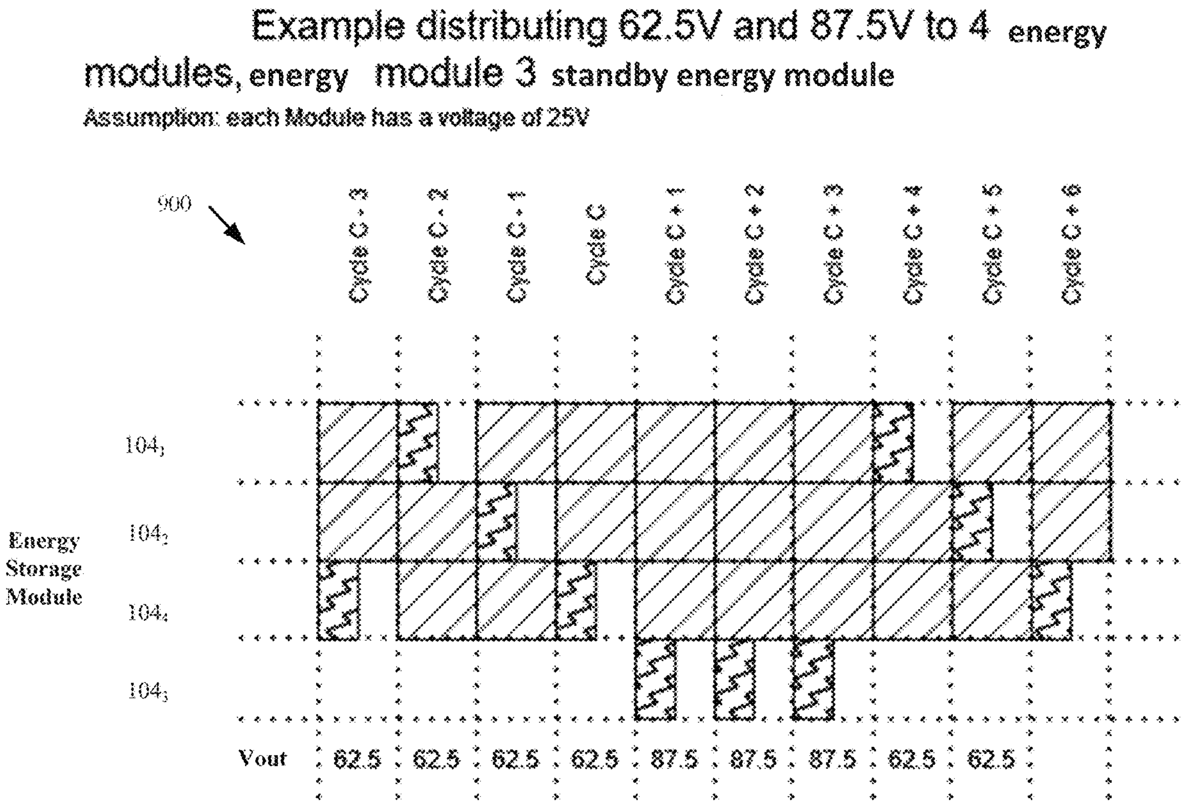

FIG. 9 provides another graph 900 in which the power supply is configured to supply 62.5 Volts during some cycles and 87.5 Volts during some other cycles. Energy storage module $\mathbf{100}_3$ has been selected as the standby energy module since it has the lowest state of charge compared to that of the other energy storage modules $\mathbf{100}_1$, $\mathbf{100}_2$, $\mathbf{100}_4$. Since only three energy storage modules are needed to supply the 62.5 Volts, standby energy storage module $\mathbf{100}_3$ is placed or remains in its bypass mode during cycle C−3, C−2, C−1, C. However, four energy storage modules are needed to supply 87.5 Volts. Thus, the standby assignment to energy storage module $\mathbf{100}_3$ is overridden. As such, energy storage module $\mathbf{100}_3$ is placed in its energy mode during cycle C+1 and remains in its energy mode during subsequent cycles C+2, C+3. The standby assignment of energy storage module $\mathbf{100}_3$ is no longer overridden in cycle C+4. Consequently, energy storage module $\mathbf{100}_3$ is returned to its bypass mode in cycle C+4. The energy storage module $\mathbf{100}_3$ remains in its bypass mode during next cycles C+5 and C+6. The present solution is not limited to the particulars of FIG. 9.

Figure 13:
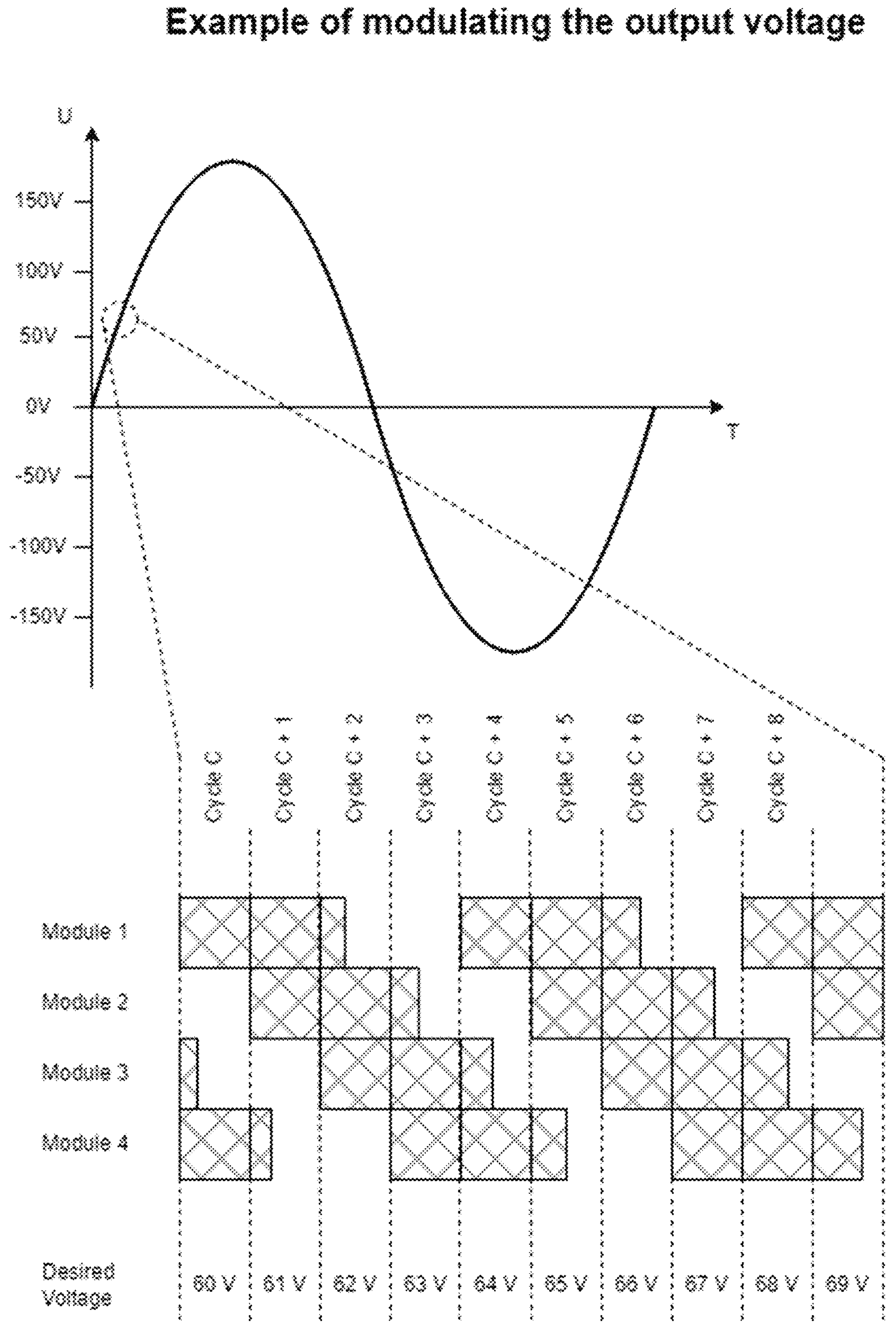
FIG. 13 provides an illustration that is useful for understanding operations of the present solution for an alternating current output scenario.

It should be noted that the illustrations of FIGS. 12-15 cover other output scenarios. FIG. 13 provides an illustration that is useful for understanding operations of the present solution for an alternating current output scenario.

Figure 10:
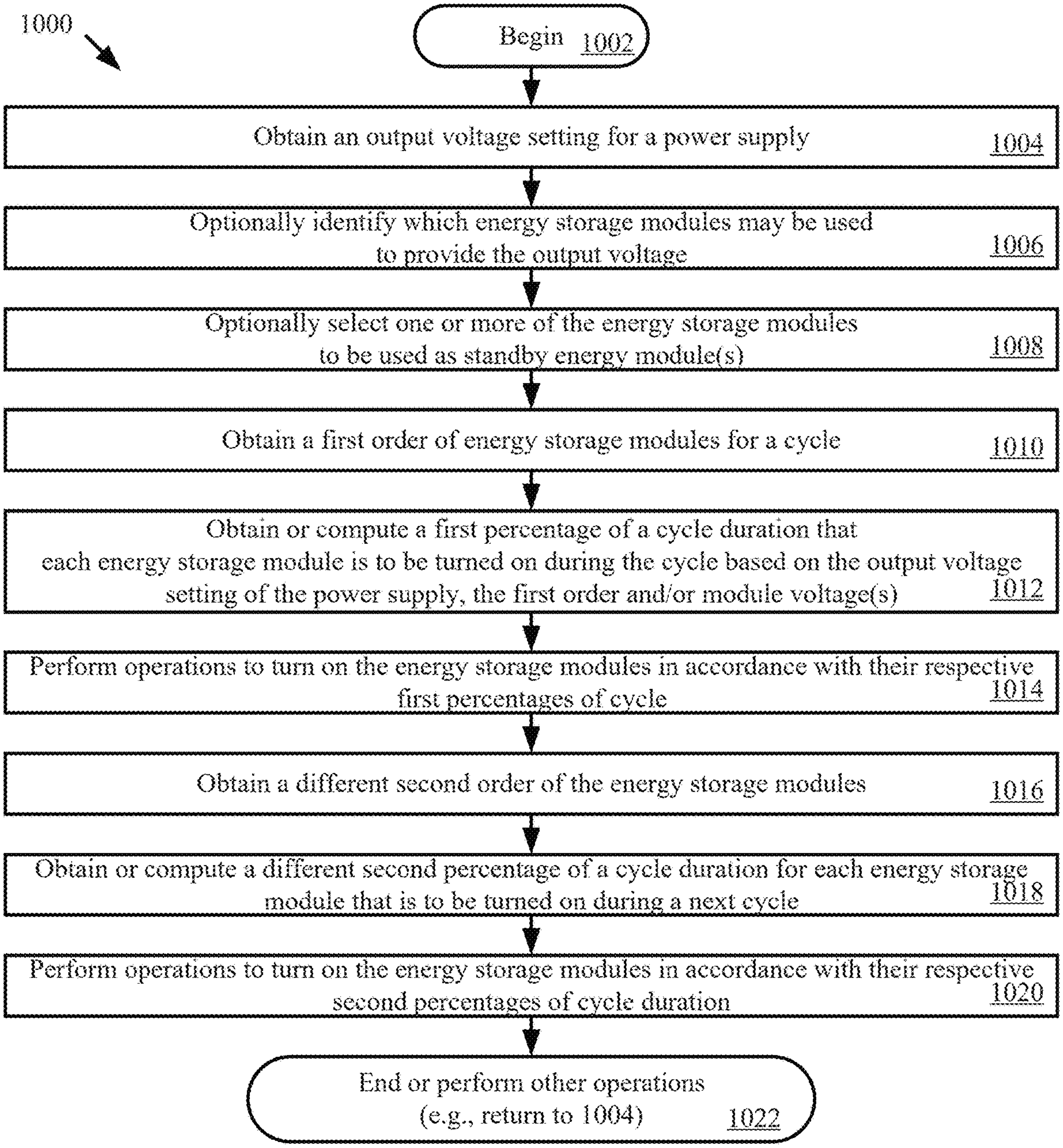
FIG. 10 provides a flow diagram of a method for controlling a power supply in accordance with the present solution.

FIG. 10 provides a flow diagram of an illustrative method 1000 for operating a power supply (e.g., power supply system 300 of FIG. 3 or 400 of FIG. 4). Some or all of the operations of method 1000 can be performed by a controller of the power supply. The operations of method 1000 can be performed in the same or different order than that shown. Method 1000 can include more or less operations than that shown in FIG. 10. For example, method 1000 may be absent of blocks 1016, 1018 and 1020.

Method 1000 begins with 1002 and continues to 1004 where an output voltage setting for the power supply is obtained. Next in optional 1006, the system identifies which energy storage module(s) may be used to provide the output voltage. This identification can be based on, for example, a level of charge of each battery module. The battery module(s) with highest level(s) of charge may be identified for use in providing the output voltage. One or more of the battery modules may be selected in block 1008 to be standby energy storage module(s). For example, the energy storage module(s) with the lowest level(s) of change is (are) selected in block 1008.

A first order, first ordered list or first ordered listing of energy storage modules for a cycle is obtained in 1010. The first order, ordered list or listing may be pre-defined and obtained from an LUT. In 1012, the system obtains or computes a first percentage of a cycle duration that each energy storage module is to be turned "on" during the cycle based on the first order, ordered list or listing, the output voltage setting of the power supply, and/or module voltages. The system then performs operations in 1014 to turn "on" the energy storage modules in accordance with their respective first percentages of cycle duration.

In 1016, the system obtains a second different order, second different ordered list or second different ordered listing of energy storage modules. The second order, second ordered list or second ordered listing may be pre-defined and obtained from an LUT. Alternatively, the second order, ordered list or listing may be dynamically determined. Different second percentages of cycle duration are obtained or computed in 1018 for each energy storage module that is to be turned "on" during the next cycle. The second percentages can be computed based on the second order, ordered list or listing, the output voltage setting of the power supply, and/or module voltages. The system then performs operations in 1020 to turn "on" the energy storage modules in accordance with their respective second percentages of cycle duration. Subsequently, method 1020 continues to 1022 where it ends or other operations are performed. The other operations can include, but are not limited to, returning to block $\mathbf{100}_2$.

Figure 14:
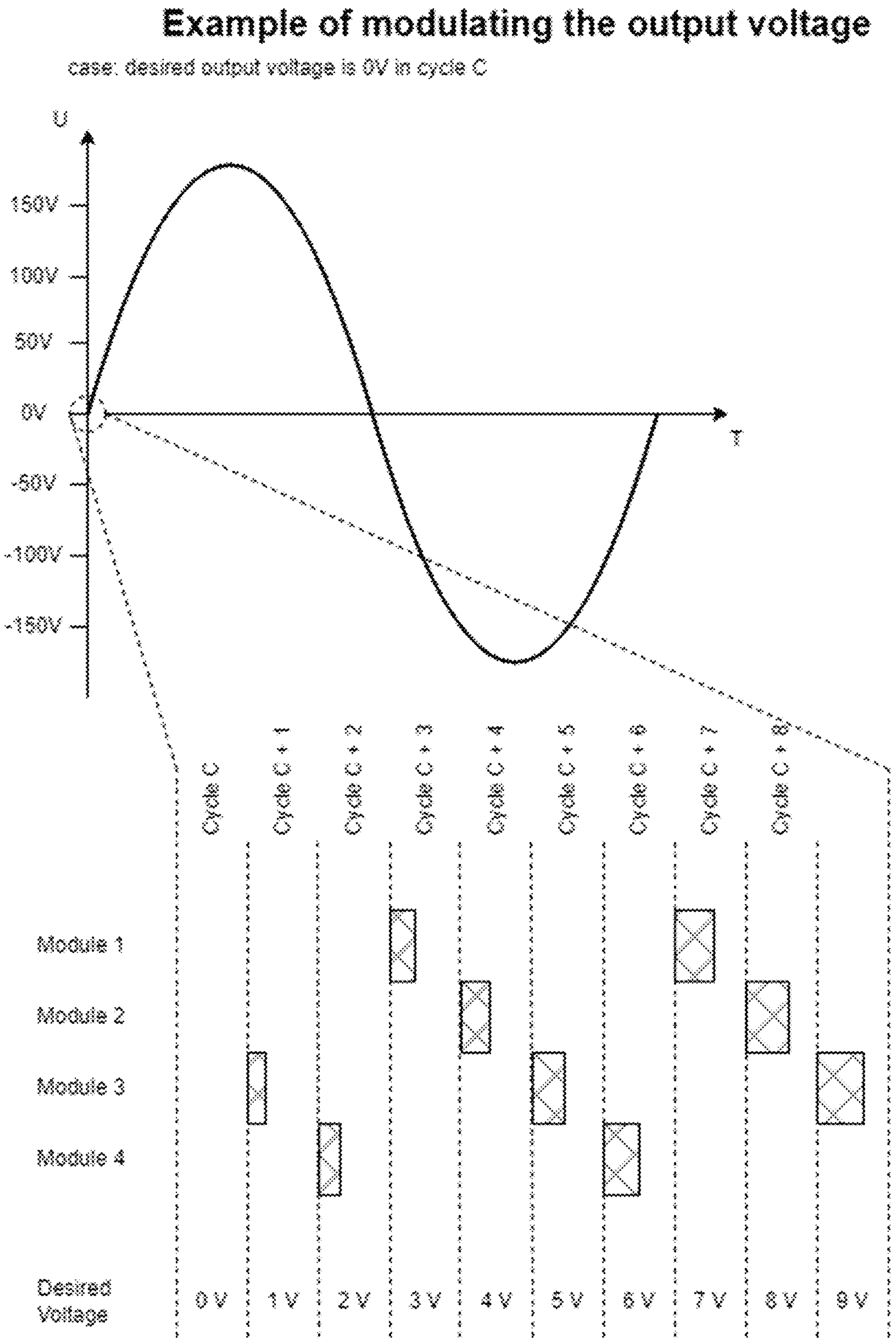
FIGS. 14-15 each provides an illustration that is useful for further understanding the present solution.
Figure 15:
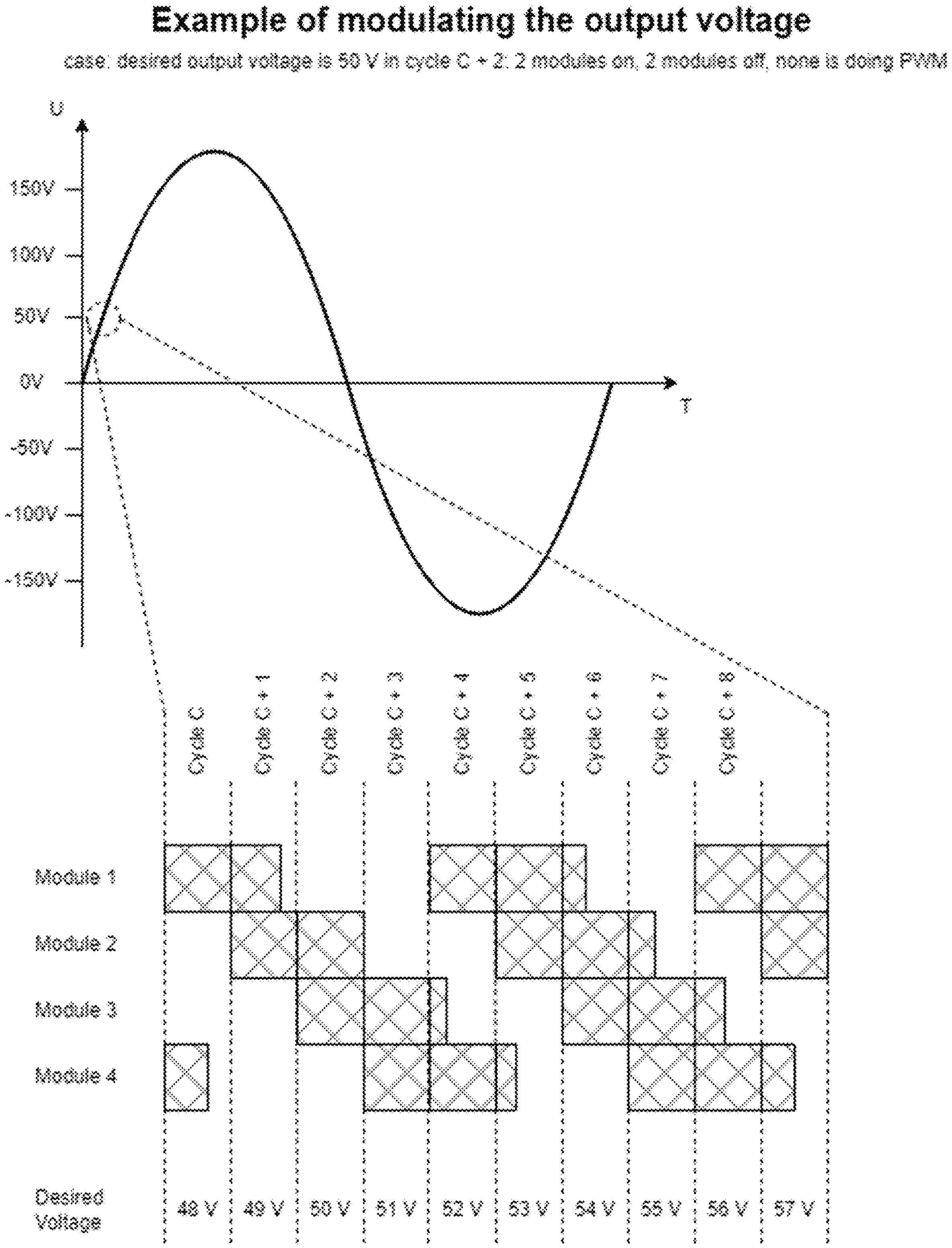

FIGS. 14 and 15 provide illustrations that are useful for understanding corner cases. FIG. 14 covers the case in which all energy storage modules are "off" in one or more cycles. For example, all of the energy storage module may be "off" in cycle C and C+10 as shown in FIG. 14. Stated differently, all energy storage modules are "on" 0% of one or more cycles. This may occur when a zero volt output is needed. FIG. 15 covers the case in which some of the energy storage modules are "on" 100% of cycle(s) while other energy storage modules are "on" 0% of the cycle(s). This can occur when a one hundred volt output is needed and there are four energy storage modules with exactly 25 volts associated therewith. In another corner case not covered by FIGS. 14-15, one energy storage module may be in its energy mode for a fraction of the cycle and all other energy storage modules are in their energy mode for the entire cycle.

Figure 11:
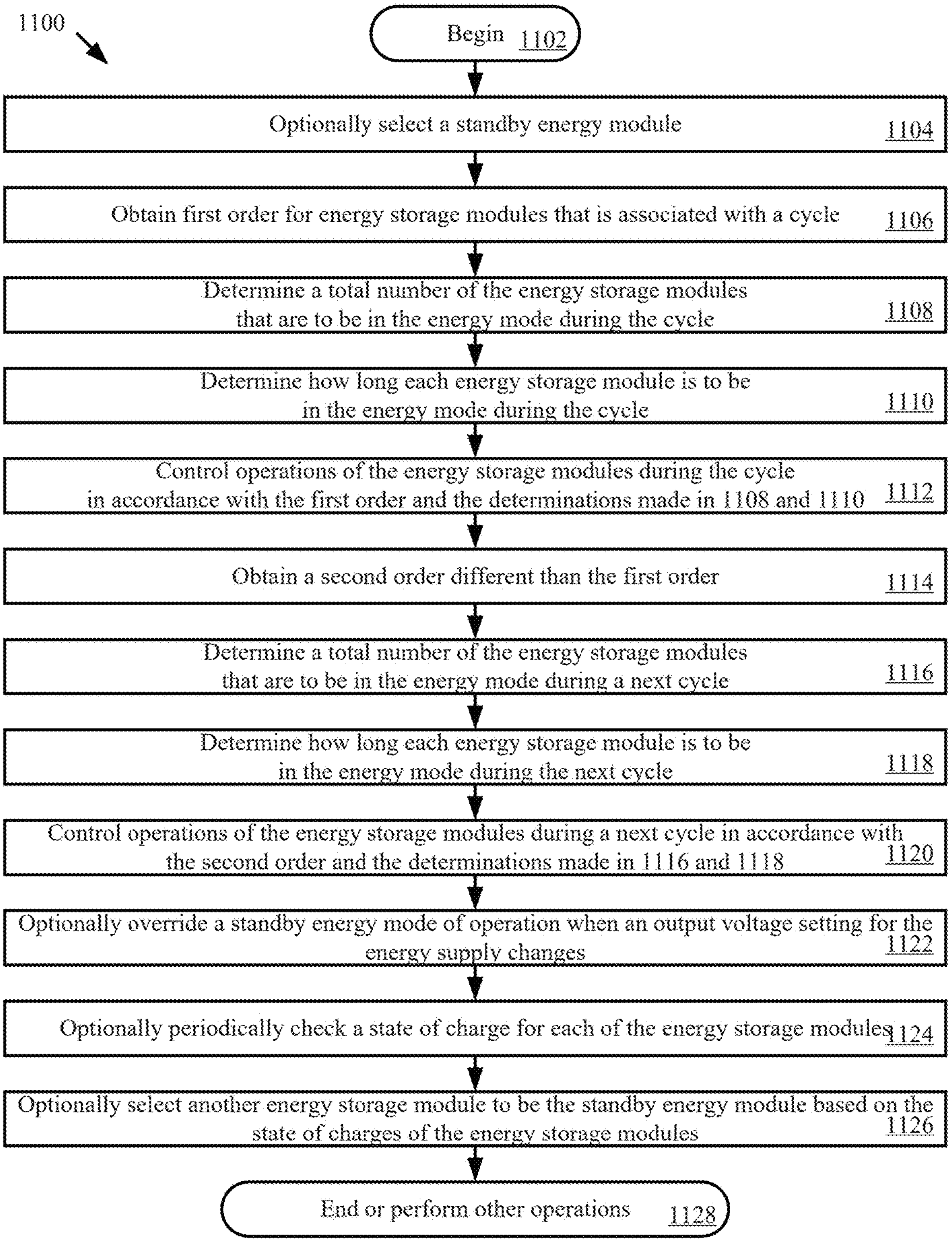
FIG. 11 provides a flow diagram of another method for controlling a power supply in accordance with the present solution.

FIG. 11 provides a flow diagram of another method 1100 for operating a power supply. Some or all of the operations of method 1100 can be performed by a controller of the power supply. The operations of method 1100 can be performed in the same or different order than that shown. Method 1100 can include more or less operations than that shown in FIG. 11. For example, method 1100 may be absent of blocks 1116, 1118 and 1120.

Method 1100 begins with 1102 and continues with 1104 where the system selects one or more energy storage modules (e.g., energy storage module 100 of FIG. 1) to be standby energy module(s) for a period of time. This selection can involve: identifying an energy storage module with a lowest state of charge; and considering the energy storage module with the lowest state of charge as being the standby energy storage module. In block 1106, the system obtains a first order, first ordered list or first ordered listing for energy storage modules that is associated with a cycle (e.g., cycle C) of a plurality of cycles having a duration. The first order, first ordered list or first ordered listing may be obtained from an LUT stored in a datastore of the power supply.

Next in 1108, the system determines a total number of energy storage modules that are to be in the energy mode during the cycle. This determination can involve: computing a first voltage remainder by subtracting at least a module voltage for the first energy storage module from an output voltage setting value of the power supply; iteratively re-computing the voltage remainder by additionally subtracting a module voltage for another energy storage module from the output voltage setting value of the power supply; discontinuing the re-computing when the voltage remainder has a negative value; and/or setting the total number of energy storage modules equal to a total number of energy storage modules associated with the module voltages used to obtain the voltage remainder having the negative value.

Block 1110 involves determining how long each energy storage module is to be in the energy mode during the cycle based on a sign of a respective value of the voltage remainder and/or a positive number corresponding to the negative value. Block 1110 may also involve determining how long another energy storage module is to be in the energy mode during the cycle based on a ratio of a value of the voltage remainder which was computed in an immediately previous iteration and the module voltage associated with the another energy storage module.

Block 1112 involves controlling operations of the energy storage modules during the cycle based on or in accordance with the first order, first ordered list or first ordered listing and the determinations made in blocks 1108 and 1110. At least a first energy storage module is in the energy mode for only a portion of the duration of the cycle. At least one second energy storage module may be in a bypass mode throughout the entirely of the cycle. The energy mode is a mode in which output terminals of a battery module are indirectly connected to each other via energy storage component(s). The bypass mode is a mode in which the output terminals of a battery module are directly connected to each other. A third energy storage module may be in the energy mode during an entire duration of the cycle.

In block 1114, the system obtains a second order, second ordered list or second ordered listing for the energy storage modules that is different from the first order, first ordered list or first ordered listing thereof. This operation can involve: shifting the first order, ordered list or ordered listing in a right or left direction to obtain the second order, second ordered list or second ordered listing; or determining the second order, ordered list or ordered listing based on a predicted state of charge of a capacitor configured to supply voltage for a high-side gate driver output stage, a duration of charge for the capacitor, a predicted time that the capacitor's charge level falls below a threshold, a last time of charge for the capacitor, a last time that an energy storage module was in the energy mode for an entire cycle, and/or a frequency that each energy storage module should be transitioned to a bypass mode to avoid or minimize a chance that a gate driver enters an undervoltage state.

Next in 1116, the system determines a total number of energy storage modules that are to be in the energy mode during the next cycle. This determination can be made by subtracting the module voltage for energy storage module(s) from the output voltage setting value of the power supply. In 1118, the system determines how long each energy storage module is to be in the energy mode during the next cycle based on a sign of a respective value of a voltage remainder and/or a positive number corresponding to a negative value of the voltage remainder.

The system then performs operations in 1120 to control the energy storage modules during a next cycle in accordance with the second order, ordered list or ordered listing and the determinations made in blocks 1116 and 1118. A fifth energy storage module (rather than the first energy storage module) is in the energy mode for only a portion of the duration of the next cycle. The second energy storage module is in the energy mode during the next cycle. The fifth energy storage module may include, but is not limited to, the third module, the fourth module or another module. The fifth energy storage module may include, but is not limited to, the third module, the fourth module or another module.

Method 1100 may continue with optional operations in blocks 1122-1126. These optional operations may involve: overriding a standby energy mode of operation for the at least one of the energy storage modules when an output voltage setting for the power supply changes; periodically checks a state of charge for each of the energy storage modules; and/or selecting at least one other energy storage module to be the standby energy module. Subsequently, method 1100 continues to block 1128 where it ends or other operations are performed. The other operations can include, but are not limited to, returning to 1106 or 1114.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described scenarios. Rather, the scope of the present solution should be defined in accordance with the following claims and their equivalents.

Without excluding further possible embodiments, certain example embodiments are summarized in the following clauses:

Clause 1: A method for operating a controllable output power circuit, comprising: providing (e.g., by a circuit) a first order or first ordered list for a plurality of energy storage modules that is associated with a cycle of a plurality of cycles having a duration; controlling (e.g., by the circuit) operations of the plurality of energy storage modules during the cycle in accordance with the first order or first ordered list, wherein at least a first energy storage module of the plurality of energy storage modules is in an energy mode for only a portion of the duration of the cycle or for less than the duration of the cycle; and controlling (e.g., by the circuit) operations of the plurality of energy storage modules during a next cycle of the plurality of cycles in accordance with a second order or second ordered list different than the first order or first ordered list, wherein at least a different second energy storage module of the plurality of energy storage modules is in the energy mode for less than the duration of the next cycle. The energy mode is a mode in which output terminals of a respective energy storage module are indirectly connected to each other via one or more energy storage components.

Clause 1A: The method of clause 1 and/or another method for operating an H-bridge inverter circuit, comprising: providing drain voltage of a high-side FETs via a high supply line, wherein a low supply line has a voltage below the high supply line; driving, by a driver circuit, the high-side FETs; using a voltage regulator to power the driver circuit by a drive voltage which is lower than the voltage on the high supply line; storing, by a bootstrap supply capacitor provided for each high-side FET, electrical energy for use in driving the respective high-side FET; charging each bootstrap supply capacitor via a respective diode; and/or allowing, by the respective diode, the bootstrap supply capacitor to be charged only when the source voltage of the corresponding FET is slewing towards the low supply line.

Clause 1B: A method for operating a controllable output power circuit, comprising:

providing a first order (e.g., providing a first ordered list) for a plurality of energy storage modules that is associated with a cycle of a plurality of cycles having a duration;

controlling operations of the plurality of energy storage modules during the cycle in accordance with the first order (e.g., based on the first ordered list), wherein at least a first energy storage module of the plurality of energy storage modules is in an energy mode for less than the duration of the cycle; and controlling operations of the plurality of energy storage modules during a next cycle of the plurality of cycles in accordance with a second order (e.g., based on a second ordered list) different than the first order (e.g., different than the first ordered list), wherein at least a different second energy storage module of the plurality of energy storage modules is in the energy mode for less than the duration of the next cycle;

wherein the energy mode is a mode in which output terminals of a respective energy storage module are indirectly connected to each other via one or more energy storage components, and wherein at least one of the different second energy storage module is selected in the second order (e.g., in the second ordered list) for recharging a capacitor of that module.

Clause 1C: The method of Clause 1B, wherein the capacitor stores charge for driving a switch of that module.

Clause 1D: The method of Clause 1B or Clause 1C, wherein the capacitor powers a gate driver circuit of that module.

Clause 1E: The method of Clause 1C or Clause 1D, wherein the switch is a high-side FET (e.g., of type MOSFET, IGFET, JFET or any of their likes or any of their combination).

Clause 1F: The method of any of Clauses 1B-1E, wherein the different second energy storage module is selected based on a discharge time calculated from the time when the module was last operated in an energy mode for less than the duration of that cycle.

Clause 1G: The method of any of Clauses 1C-1F, wherein the switch is part of an inverter circuit (such as a half H-bridge inverter, or a full H-bridge inverter).

Clause 1H: The method of any of Clauses 1C-1G, wherein, the capacitor is charged via driving a low-side switch connected to the switch (e.g., the switch being a high-side switch).

Clause 1I: The method of any of the Clauses 1B-1H, wherein, the capacitor arranged such that it receives charge via a diode (e.g., a first terminal of the capacitor is connected at the cathode terminal of the diode. The anode terminal of the diode may be connected to a supply voltage from which charge is supplied to the capacitor).

Clause 1J: The method of Clause 1H or 1I, wherein a terminal (e.g., a second terminal) of the capacitor is connected at an output node located between the switch and the low-side switch.

Clause 2: The method of any of the preceding clauses, further comprising determining (e.g., by the circuit) a total number of energy storage modules that are to be in the energy mode during the cycle by computing a first voltage remainder by subtracting at least a module voltage for the first energy storage module from an output voltage setting value of the controllable output power circuit.

Clause 3: The method of any of the preceding clauses, wherein said determining further comprises iteratively re-computing the voltage remainder by additionally subtracting a module voltage for another energy storage module of the plurality of energy storage modules from the output voltage setting value of the controllable output power circuit.

Clause 4: The method of any of the preceding clauses, wherein said determining further comprises discontinuing said re-computing when the voltage remainder has a negative value.

Clause 5: The method of any of the preceding clauses, wherein said determining further comprises setting the total number of energy storage modules equal to a total number of energy storage modules associated with the module voltages used to obtain the voltage remainder having the negative value.

Clause 6: The method of any of the preceding clauses, further comprising determining (e.g., by the circuit) how long each energy storage module of the plurality of energy storage modules is to be in the energy mode during the cycle based on a sign of a respective value of the voltage remainder and/or a positive number corresponding to the negative value.

Clause 7: The method of any of the preceding clauses, further comprising determining, by the circuit, how long the another energy storage module is to be in the energy mode during the cycle based on a ratio of a value of the voltage remainder which was computed in an immediately previous iteration and the module voltage associated with the another energy storage module.

Clause 8: The method of any of the preceding clauses, wherein the first order or first ordered list for a plurality of energy storage modules is obtained from a look-up table stored in a memory of the controllable output power circuit.

Clause 9: The method of any of the preceding clauses, further comprising shifting the first order or first ordered list in a right or left direction to obtain the second order or second ordered list.

Clause 10: The method of any of the preceding clauses, further comprising determining the second order or second ordered list based on a predicted state of charge of a capacitor configured to supply voltage for a high-side gate driver output stage, a duration of charge for the capacitor, a predicted time that the capacitor's charge level falls below a threshold, a last time of charge for the capacitor, a last time that an energy storage module was in the energy mode for an entire cycle, and/or a frequency that each energy storage module should be transitioned to a bypass mode to avoid or minimize a chance that a gate driver enters an undervoltage state.

Clause 11: The method of any of the preceding clauses, wherein at least a third energy storage module of the plurality of energy storage modules is in a bypass mode throughout an entirety of the cycle, the bypass mode being a mode in which an output terminals of an energy storage module (e.g., a battery module) are directly connected (e.g., via one or more switches) to each other.

Clause 12: The method of any of the preceding clauses, wherein the third energy storage module is in the storage energy mode during the next cycle.

Clause 13: The method of any of the preceding clauses, wherein at least a fourth energy storage module is in the energy mode during an entire duration of the cycle.

Clause 14: The method of any of the preceding clauses, further comprising selecting at least one of the plurality of energy storage modules to be a standby energy storage module for a period of time.

Clause 15: The method of any of the preceding clauses, wherein the selecting comprises identifying an energy storage module of the plurality of energy storage modules with a lowest or highest state of charge, and considering the energy storage module with the lowest or highest state of charge as being the standby energy storage module.

Clause 16: The method of any of the preceding clauses, further comprising overriding a standby energy mode of operation for the at least one of the plurality of energy storage modules when an output voltage setting for the power supply changes.

Clause 17: The method of any of the preceding clauses, further comprising periodically checking a state of charge for each of the plurality of energy storage modules.

Clause 18: The method of any of the preceding clauses, further comprising selecting at least one other one of the plurality of energy storage modules to be the standby energy storage module.

Clause 19: A controllable output power circuit, comprising a processor configured to: obtain a first order or first ordered list for a plurality of energy storage modules that is associated with a cycle of a plurality of cycles having a duration; control operations of the plurality of energy storage modules during the cycle in accordance with the first order or first ordered list, wherein at least a first energy storage module of the plurality of energy storage modules is in an energy mode for only a portion of the duration of the cycle or for less than the duration of the cycle; and control operations of the plurality of energy storage modules during a next cycle of the plurality of cycles in accordance with a second order or second ordered list different than the first order or first ordered list, wherein at least a different second energy storage module of the plurality of energy storage modules is in the energy mode for less than the duration of the next cycle.

Clause 20: A controllable output power circuit, comprising: a plurality of energy storage modules; and a circuit communicatively connected to the plurality of energy storage modules and configured to: obtain a first order or first ordered list for the plurality of energy storage modules that is associated with a cycle of a plurality of cycles having a duration; control operations of the plurality of energy storage modules during the cycle in accordance with the first order or first ordered list, wherein at least a first energy storage module of the plurality of energy storage modules is in an energy mode for only a portion of the duration of the cycle or for less than the duration of the cycle; and control operations of the plurality of energy storage modules during a next cycle of the plurality of cycles in accordance with a second order or second ordered list different than the first order or first ordered list, wherein at least a different second energy storage module of the plurality of energy storage modules is in the energy mode for less than the duration of the next cycle.

Clause 21: An H-bridge inverter circuit (144) comprising a supply bus, driver circuit (176), a voltage regulator (164), and a bootstrap supply capacitor (178). The supply bus comprises: a high supply line (152) disposed to provide drain voltage to high-side FETs (110-2 and 110-1); and a low supply line (154) with a voltage below the high supply line (152). The driver circuit (176) is provided for driving the high-side FETs (110-2, 110-1). The voltage regulator (164) is provided for powering the driver circuit (176, 166) by a drive voltage (V at 166 output) which is lower than the voltage on the supply line (V at 152). The bootstrap supply capacitor (178) is provided for each high-side FET (110-2, 110-1). Each bootstrap supply capacitor (178) is configured to store electrical energy which is used to drive the respective high-side FET (110-2, 110-1). Each bootstrap supply capacitor (178) is chargeable via a respective diode (166) which allows its bootstrap supply capacitor (178) to be charged only when the source voltage (V at 156, 158) of the corresponding FET is slewing towards the low supply line (V at 154).

Clause 22: System (e.g., an electrical system or unit) comprising means for performing the method steps of any of the herein disclosed methods, e.g., method steps.

Clause 23: A software product comprising instructions which when executed by a suitable processor or electrical unit or system, causes the processor or the electrical unit or system to perform the herein disclosed methods, e.g., method steps.

The breadth and scope of this disclosure should not be limited by any of the above-described example embodiments, but should be defined only in accordance with the following claims and their equivalents.

The invention claimed is:

1. A method for operating a controllable output power circuit, comprising:

providing a first ordered list for a plurality of energy storage modules that is associated with a cycle of a plurality of cycles having a duration;

controlling operations of the plurality of energy storage modules during the cycle based on the first ordered list, wherein at least a first energy storage module of the plurality of energy storage modules is in an energy mode for less than the duration of the cycle;

controlling operations of the plurality of energy storage modules during a next cycle of the plurality of cycles based on a second ordered list different than the first ordered list, wherein at least a different second energy storage module of the plurality of energy storage modules is in the energy mode for less than the duration of the next cycle; and determining a total number of energy storage modules that are to be in the energy mode during the cycle by computing a voltage remainder by subtracting at least a module voltage for the first energy storage module from an output voltage setting value of the controllable output power circuit;

wherein the energy mode is a mode in which output terminals of a respective energy storage module are indirectly connected to each other via one or more energy storage components.

2. The method according to claim 1, wherein at least one of the different second energy storage module is selected in the second ordered list for recharging a capacitor of that module.

3. The method according to claim 1, wherein said determining further comprises iteratively re-computing the voltage remainder by additionally subtracting a module voltage for another energy storage module of the plurality of energy storage modules from the output voltage setting value of the controllable output power circuit.

4. The method according to claim 1, wherein said determining further comprises discontinuing said re-computing when the voltage remainder has a negative value.

5. The method according to claim 4, wherein said determining further comprises setting the total number of energy storage modules equal to a total number of energy storage modules associated with the module voltages used to obtain the voltage remainder having the negative value.

6. The method according to claim 4, further comprising determining how long each energy storage module of the plurality of energy storage modules is to be in the energy mode during the cycle based on a sign of a respective value of the voltage remainder and/or a positive number corresponding to the negative value.

7. The method according to claim 1, wherein the first ordered list for a plurality of energy storage modules is obtained from a look-up table stored in a memory of the controllable output power circuit.

8. The method according to claim 1, wherein at least a third energy storage module of the plurality of energy storage modules is in a bypass mode throughout an entirety of the cycle, the bypass mode being a mode in which output terminals of an energy storage module are directly connected to each other.

9. The method according to claim 8, wherein the third energy storage module is in a storage energy mode during the next cycle.

10. The method according to claim 1, further comprising selecting at least one of the plurality of energy storage modules to be a standby energy storage module for a period of time.

11. The method according to claim 10, wherein the selecting comprises identifying an energy storage module of the plurality of energy storage modules with a lowest or highest state of charge, and considering the energy storage module with the lowest or highest state of charge as being the standby energy module.

12. The method according to claim 1, wherein the different second energy storage module is selected based on a discharge time calculated from the time when the module was last operated in an energy mode for less than the duration of that cycle.

13. The method according to claim 1, wherein the operations of the plurality of energy storage modules are controlled using a switch that is part of an inverter circuit.

14. The method according to claim 1, further comprising shifting a first ordered for a plurality of energy storage modules in the first ordered list in a given direction to obtain a second order for the plurality of energy storage modules in the second list.

15. The method according to claim 1, further comprising overriding a standby energy mode of operation for the at least one of the plurality of energy storage modules when an output voltage setting for the power supply changes.

16. An electrical system, comprising:

a plurality of energy storage modules; and a circuit communicatively connected to the plurality of energy storage modules and configured to:

obtain a first order or first ordered list for a plurality of energy storage modules that is associated with a cycle of a plurality of cycles having a duration;

control operations of the plurality of energy storage modules during the cycle in accordance with the first order or first ordered list, wherein at least a first energy storage module of the plurality of energy storage modules is in an energy mode for only a portion of the duration of the cycle or for less than the duration of the cycle;

control operations of the plurality of energy storage modules during a next cycle of the plurality of cycles in accordance with a second order or second ordered list different than the first order or first ordered list, wherein at least a different second energy storage module of the plurality of energy storage modules is in the energy mode for less than the duration of the next cycle; and determine a total number of energy storage modules that are to be in the energy mode during the cycle by computing a voltage remainder by subtracting at least a module voltage for the first energy storage module from an output voltage setting value of the controllable output power circuit;

wherein the energy mode is a mode in which output terminals of a respective energy storage module are indirectly connected to each other via one or more energy storage components.

17. A system, comprising:

one or more processors; and a non-transitory computer-readable storage medium comprising programming instructions that are configured to cause the one or more processors to:

obtain a first order or first ordered list for a plurality of energy storage modules that is associated with a cycle of a plurality of cycles having a duration;

control operations of the plurality of energy storage modules during the cycle in accordance with the first order or first ordered list, wherein at least a first energy storage module of the plurality of energy storage modules is in an energy mode for only a portion of the duration of the cycle or for less than the duration of the cycle; and control operations of the plurality of energy storage modules during a next cycle of the plurality of cycles in accordance with a second order or second ordered list different than the first order or first ordered list, wherein at least a different second energy storage module of the plurality of energy storage modules is in the energy mode for less than the duration of the next cycle;

determine a total number of energy storage modules that are to be in the energy mode during the cycle by computing a voltage remainder by subtracting at least a module voltage for the first energy storage module from an output voltage setting value of the controllable output power circuit;

wherein the energy mode is a mode in which output terminals of a respective energy storage module are indirectly connected to each other via one or more energy storage components.

18. A method for operating a controllable output power circuit, comprising:

providing a first ordered list for a plurality of energy storage modules that is associated with a cycle of a plurality of cycles having a duration;

controlling operations of the plurality of energy storage modules during the cycle based on the first ordered list, wherein at least a first energy storage module of the plurality of energy storage modules is in an energy mode for less than the duration of the cycle;

controlling operations of the plurality of energy storage modules during a next cycle of the plurality of cycles based on a second ordered list different than the first ordered list, wherein at least a different second energy storage module of the plurality of energy storage modules is in the energy mode for less than the duration of the next cycle; and determining, by the circuit, how long the another energy storage module is to be in the energy mode during the cycle based on a ratio of a value of a voltage remainder which was computed in an immediately previous iteration and the module voltage associated with the another energy storage module;

wherein the energy mode is a mode in which output terminals of a respective energy storage module are indirectly connected to each other via one or more energy storage components.

19. The method according to claim 18, wherein at least one of the different second energy storage module is selected in the second ordered list for recharging a capacitor of that module.

20. The method according to claim 18, further comprising determining a total number of energy storage modules that are to be in the energy mode during the cycle by computing a voltage remainder by subtracting at least a module voltage for the first energy storage module from an output voltage setting value of the controllable output power circuit.

21. The method according to claim 20, wherein said determining further comprises iteratively re-computing the voltage remainder by additionally subtracting a module voltage for another energy storage module of the plurality of energy storage modules from the output voltage setting value of the controllable output power circuit.

22. The method according to claim 20, wherein said determining further comprises discontinuing said re-computing when the voltage remainder has a negative value.

23. The method according to claim 22, wherein said determining further comprises setting the total number of energy storage modules equal to a total number of energy storage modules associated with the module voltages used to obtain the voltage remainder having the negative value.

24. The method according to claim 22, further comprising determining how long each energy storage module of the plurality of energy storage modules is to be in the energy mode during the cycle based on a sign of a respective value of the voltage remainder and/or a positive number corresponding to the negative value.

25. The method according to claim 18, further comprising determining the second ordered list based on a predicted state of charge of a capacitor connected and configured to supply voltage to a high-side gate driver output stage, a duration of charge for the capacitor, a predicted time that the capacitor's charge level falls below a threshold, a last time of charge for the capacitor, a last time that an energy storage module was in the energy mode for an entire cycle, and/or a frequency that each energy storage module should be transitioned to a bypass mode to avoid or minimize a chance that a gate driver enters an undervoltage state.

26. The method according to claim 18, wherein at least a third energy storage module of the plurality of energy storage modules is in a bypass mode throughout an entirety of the cycle, the bypass mode being a mode in which output terminals of an energy storage module are directly connected to each other.

27. The method according to claim 18, further comprising selecting at least one of the plurality of energy storage modules to be a standby energy storage module for a period of time.

28. The method according to claim 27, wherein the selecting comprises identifying an energy storage module of the plurality of energy storage modules with a lowest or highest state of charge, and considering the energy storage module with the lowest or highest state of charge as being the standby energy module.

29. A method for operating a controllable output power circuit, comprising:

providing a first ordered list for a plurality of energy storage modules that is associated with a cycle of a plurality of cycles having a duration;

controlling operations of the plurality of energy storage modules during the cycle based on the first ordered list, wherein at least a first energy storage module of the plurality of energy storage modules is in an energy mode for less than the duration of the cycle;

controlling operations of the plurality of energy storage modules during a next cycle of the plurality of cycles based on a second ordered list different than the first ordered list, wherein at least a different second energy storage module of the plurality of energy storage modules is in the energy mode for less than the duration of the next cycle; and determining the second ordered list based on a predicted state of charge of a capacitor connected and configured to supply voltage to a high-side gate driver output stage, a duration of charge for the capacitor, a predicted time that the capacitor's charge level falls below a threshold, a last time of charge for the capacitor, a last time that an energy storage module was in the energy mode for an entire cycle, and/or a frequency that each energy storage module should be transitioned to a bypass mode to avoid or minimize a chance that a gate driver enters an undervoltage state;

wherein the energy mode is a mode in which output terminals of a respective energy storage module are indirectly connected to each other via one or more energy storage components.

30. The method according to claim 29, wherein at least one of the different second energy storage module is selected in the second ordered list for recharging a capacitor of that module.

31. The method according to claim 29, further comprising determining a total number of energy storage modules that are to be in the energy mode during the cycle by computing a voltage remainder by subtracting at least a module voltage for the first energy storage module from an output voltage setting value of the controllable output power circuit.

32. The method according to claim 31, wherein said determining further comprises iteratively re-computing the voltage remainder by additionally subtracting a module voltage for another energy storage module of the plurality of energy storage modules from the output voltage setting value of the controllable output power circuit.

33. The method according to claim 31, wherein said determining further comprises discontinuing said re-computing when the voltage remainder has a negative value.

34. The method according to claim 33, wherein said determining further comprises setting the total number of energy storage modules equal to a total number of energy storage modules associated with the module voltages used to obtain the voltage remainder having the negative value.

35. The method according to claim 33, further comprising determining how long each energy storage module of the plurality of energy storage modules is to be in the energy mode during the cycle based on a sign of a respective value of the voltage remainder and/or a positive number corresponding to the negative value.

36. The method according to claim 29, wherein at least a third energy storage module of the plurality of energy storage modules is in a bypass mode throughout an entirety of the cycle, the bypass mode being a mode in which output terminals of an energy storage module are directly connected to each other.

37. The method according to claim 29, further comprising selecting at least one of the plurality of energy storage modules to be a standby energy storage module for a period of time.

38. The method according to claim 37, wherein the selecting comprises identifying an energy storage module of the plurality of energy storage modules with a lowest or highest state of charge, and considering the energy storage module with the lowest or highest state of charge as being the standby energy module.

* * * * *